United States Patent
Murase et al.

(10) Patent No.: US 7,493,662 B2
(45) Date of Patent: Feb. 17, 2009

(54) DATA NULLIFICATION DEVICE FOR NULLIFYING DIGITAL CONTENT RECORDED ON A RECORDING MEDIUM, AFTER THE DIGITAL CONTENT HAS BEEN REPRODUCED, A PREDETERMINED TIME PERIOD HAS PASSED SINCE THE RECORDING OF THE DIGITAL CONTENT, OR THE DIGITAL CONTENT HAS BEEN MOVED TO ANOTHER RECORDING MEDIUM

(75) Inventors: Kaoru Murase, Ikoma-gun (JP);
Yoshihiko Motohashi, Osaka (JP);
Masaya Miyazaki, Ikeda (JP);
Yoshikatsu Ito, Hirakata (JP)

(73) Assignee: Panasonic Corporation, Osaka (JP)

( * ) Notice: Subject to any disclaimer, the term of this patent is extended or adjusted under 35 U.S.C. 154(b) by 527 days.

(21) Appl. No.: 10/066,725

(22) Filed: Feb. 6, 2002

(65) Prior Publication Data
US 2002/0126843 A1     Sep. 12, 2002

(30) Foreign Application Priority Data
Feb. 15, 2001     (JP)     ............... 2001-039140

(51) Int. Cl.
*H04N 7/167*     (2006.01)
*G06F 12/14*     (2006.01)
*H04N 7/169*     (2006.01)
*H04N 7/171*     (2006.01)
(52) U.S. Cl. .................... 726/33; 713/193; 386/94
(58) Field of Classification Search .................. 726/33; 386/94
See application file for complete search history.

(56) References Cited

U.S. PATENT DOCUMENTS

| 4,275,422 | A | * | 6/1981 | Le Couteur | ............... 348/97 |
| 4,462,078 | A | * | 7/1984 | Ross | ............... 726/32 |
| 4,959,861 | A | * | 9/1990 | Howlette | ............... 726/33 |
| 4,975,898 | A | * | 12/1990 | Yoshida | ............... 369/100 |

(Continued)

FOREIGN PATENT DOCUMENTS

CN     1275288     11/2000

(Continued)

OTHER PUBLICATIONS

NIST "An Introduction to Computer Security: The NIST Handbook" Special Publication 800-12, 1996, NIST, pp. 76-77 and 162.*

(Continued)

*Primary Examiner*—Christopher A Revak
*Assistant Examiner*—Matthew T Henning
(74) *Attorney, Agent, or Firm*—Wenderoth, Lind & Ponack, L.L.P.

(57) ABSTRACT

In a data nullification device for nullifying target data recorded on a recording medium, target data is made up of a plurality of data blocks. A judging unit judges, in units of data blocks, whether the target data needs to be nullified. A nullifying unit nullifies, when a predetermined number of data blocks are judged as needing to be nullified or when one or more data blocks whose total amount of data reaches a predetermined amount are judged as needing to be nullified, the judged data blocks.

29 Claims, 8 Drawing Sheets

U.S. PATENT DOCUMENTS

| | | | | |
|---|---|---|---|---|
| 5,400,402 | A * | 3/1995 | Garfinkle | 380/231 |
| 5,528,755 | A * | 6/1996 | Beardsley et al. | 714/48 |
| 5,623,693 | A * | 4/1997 | Ashton et al. | 710/5 |
| 5,675,534 | A * | 10/1997 | Hewitt et al. | 365/185.04 |
| 5,717,816 | A * | 2/1998 | Boyce et al. | 386/111 |
| 5,742,807 | A * | 4/1998 | Masinter | 707/1 |
| 5,745,639 | A * | 4/1998 | Gensheimer | 386/70 |
| 5,764,607 | A * | 6/1998 | Maeda et al. | 369/47.12 |
| 5,796,826 | A * | 8/1998 | Park | 380/203 |
| 5,826,083 | A * | 10/1998 | Prasad | 718/105 |
| 5,870,468 | A * | 2/1999 | Harrison | 713/165 |
| 5,896,255 | A * | 4/1999 | Mardirossian | 360/133 |
| 5,920,673 | A | 7/1999 | Yasukohichi et al. | |
| 6,144,743 | A | 11/2000 | Yamada et al. | |
| 6,169,570 | B1 | 1/2001 | Suzuki | |
| 6,189,141 | B1 * | 2/2001 | Benitez et al. | 717/153 |
| 6,212,600 | B1 * | 4/2001 | Friedman et al. | 711/112 |
| 6,341,342 | B1 * | 1/2002 | Thompson et al. | 711/166 |
| 6,507,911 | B1 * | 1/2003 | Langford | 713/193 |
| 6,571,312 | B1 * | 5/2003 | Sugai et al. | 711/103 |
| 6,577,810 | B1 | 6/2003 | Ogino | |
| 6,606,714 | B1 * | 8/2003 | Thelin | 714/8 |
| 6,694,022 | B1 | 2/2004 | Matsushita | |
| 6,798,971 | B2 * | 9/2004 | Potrebic | 386/46 |
| 6,963,418 | B1 * | 11/2005 | Tanimoto | 358/1.15 |
| 6,981,272 | B1 * | 12/2005 | Morinaga et al. | 725/25 |
| 7,373,075 | B1 * | 5/2008 | Ando et al. | 386/68 |
| 2001/0047497 | A1 * | 11/2001 | Larson et al. | 714/42 |
| 2002/0016963 | A1 | 2/2002 | Inoue et al. | |
| 2003/0050996 | A1 * | 3/2003 | Yohe et al. | 709/217 |

FOREIGN PATENT DOCUMENTS

| | | |
|---|---|---|
| EP | 0 763 936 | 3/1997 |
| EP | 0 773 490 | 5/1997 |
| EP | 0 878 794 | 11/1998 |
| GB | 2 305 339 | 4/1997 |
| KR | 1998-018515 | 6/1998 |
| KR | 1998-086758 | 12/1998 |
| WO | 44 33 868 | 5/1995 |
| WO | 99/33265 | 7/1999 |
| WO | 99/46933 | 9/1999 |
| WO | 01/48755 | 7/2001 |

OTHER PUBLICATIONS

Macinnis, A.G., entitled "The MPEG Systems Coding Specification", Signal Processing. Image Communication, Elsevier Science Publishers, Amsterdam, NL, vol. 4, No. 2, Apr. 1, 1992, pp. 153-159, XP000273161.

* cited by examiner

DATA NULLIFICATION DEVICE FOR NULLIFYING DIGITAL CONTENT RECORDED ON A RECORDING MEDIUM, AFTER THE DIGITAL CONTENT HAS BEEN REPRODUCED, A PREDETERMINED TIME PERIOD HAS PASSED SINCE THE RECORDING OF THE DIGITAL CONTENT, OR THE DIGITAL CONTENT HAS BEEN MOVED TO ANOTHER RECORDING MEDIUM

This application is based on an application No. 2001-039140 filed in Japan, the contents of which are hereby incorporated by reference.

BACKGROUND OF THE INVENTION

1. Field of the Invention

The present invention relates to a device for nullifying data to protect its copyright, and in particular relates to techniques for enhancing user convenience while protecting copyrighted data.

2. Related Art

The digitization of information has been increasing in recent years. Since digitized information (hereafter referred to as "digital content") not only is relatively easy to handle but also does not degrade in quality with time, information such as audio and video data is becoming more and more digitized.

On the other hand, digital content can be copied perfectly with no decrease in quality. This provokes unauthorized acts such as illegal duplication or tampering of copyrighted information.

To discourage such unauthorized acts, a method may be employed that encrypts digital content, and provides a decryption key for decrypting the encrypted digital content (hereafter simply referred to as "encrypted content") only to devices of authorized users who have agreed to pay a usage fee to the copyright holder.

This prohibits the encrypted content from being decrypted using devices other than those of the authorized users. Hence the digital content can be protected from unauthorized use.

Also, there is a method for indicating the copyright protection status of digital content. According to this method, copy control information (CCI) that shows whether copying of the digital content is permitted or not is attached to the digital content.

In more detail, the copy control information carries one of the four instructions "Copy Never", "Copy one Generation", "Copy No more", and "Copy Free".

"Copy Never" means no copies of digital content are permitted.

"Copy one Generation" means only a first generation copy of digital content is permitted. The first generation copy of the digital content is given copy control information "Copy No more".

"Copy No more" is copy control information that is attached to digital content which is a first generation copy of digital content whose copy control information is "Copy one Generation". "Copy No more" means copying is not permitted any more though it was previously.

"Copy Free" means digital content can be copied freely.

In commercial digital broadcasting and the like, digital content is transmitted via a transmission line in the following manner. If the copy control information of the digital content is "Copy Never", "Copy one Generation", or "Copy No more", it is definitely transmitted in an encrypted form, to ensure security on the transmission line. If the copy control information of the digital content is "Copy Free", it is usually transmitted in an unencrypted form.

When the user obtains digital content whose copy control information is "Copy Never" via a transmission line and reproduces it, the user is prohibited from copying the obtained digital content to a recording medium. Also, when the user obtains digital content whose copy control information is "Copy one Generation" and records it onto a recording medium thereby generating digital content whose copy control information is "Copy No more", the user cannot copy the digital content recorded on the recording medium to another recording medium. In such cases where copying of digital content is completely prohibited, the user is likely to encounter a lot of inconveniences.

If copying of digital content transmitted via a transmission line is permitted, the user can perform time shifting, i.e., the user can record the digital content to a recording medium for later reproduction, or the user can record the digital content to a recording medium such as an HDD (hard disk drive) and at the same time reproduce it. However, in the case of digital content marked as "Copy Never", once the user breaks off viewing the digital content to go to the bathroom or to answer the telephone or doorbell, he or she cannot view the missed part unless the digital content is rebroadcast. Many movie films run for about two hours, and some feature length films even run for more than four hours. Also, commercial digital broadcasting and the like are usually commercial-free. Therefore, to view an entire movie film or the like which is marked as "Copy Never", the user cannot answer the phone or doorbell and cannot even go to the bathroom for the running time of the movie film that lasts two to four hours. This causes a great deal of inconvenience to the user.

Also, if copying of digital content is still permitted after the user acquires the digital content and records it to a recording medium, the user can freely copy or move the recorded digital content to another recording medium. However, in the case of digital content marked as "Copy one Generation", once the user has acquired the digital content and recorded it onto some recording medium, the user cannot move that digital content to another recording medium. Since it is convenient to use a fixed recording medium such as an HDD that is easy to use and quick to access, the user is likely to record the acquired digital content first of all to such a fixed recording medium. However, fixed recording media have only limited capacities. Also, general fixed recording media such as HDDs are more susceptible to breakage than removable recording media, as they tend to be constantly used. For these reasons, if the user views the digital content and wants to store it long-term, it is desirable to move the digital content to a removable recording medium, such as a DVD-RW or a digital videotape, that has a larger capacity and is more preferable for long-term storage.

However, it is not acceptable, in terms of copyright protection, to alter the non-copyable status of the copyrighted digital content so as to improve user-friendliness.

Under copyright protection, digital content whose copy control information is "Copy Never" can be viewed but cannot be copied, whilst digital content whose copy control information is "Copy one Generation" can be copied only once.

In view of this, it is desirable to allow copying of digital content under a specific condition but then reliably nullify the digital content. In this way, user-friendliness can be improved without departing from the principle of copy prohibition.

SUMMARY OF THE INVENTION

The present invention has an object of providing a data nullification device, a data nullification method, a data nullification program, and a computer-readable recording medium recording a data nullification program which enable user-friendliness to be improved without departing from the principle of copy prohibition.

The stated object can be achieved by a data nullification device for nullifying target data recorded on a recording medium, the target data being made up of a plurality of data blocks, the data nullification device including: a judging unit operable to judge, for each data block recorded on the recording medium, whether the data block needs to be nullified; and a nullifying unit operable to nullify, when a predetermined number of data blocks are judged as needing to be nullified or when one or more data blocks whose total amount of data reaches a predetermined amount are judged as needing to be nullified, the judged data blocks.

With this construction, when a predetermined number of data blocks satisfy a specific condition or one or more data blocks whose total amount of data reaches a predetermined amount satisfy the specific condition, the data blocks are nullified.

Accordingly, when the target data is marked as "Copy Never" or "Copy No more", a copy can be made but then the copy or the original is reliably nullified. In this way, user-friendliness can be improved without departing from the principle of copy prohibition.

Also, since the target data is nullified in a predetermined data unit, even if an unauthorized user tries to obtain the copy by powering off the device halfway through the operation, he or she cannot obtain the whole target data. By employing an appropriate data unit for the nullification, security can be improved.

Here, the recording medium may store sequence information that shows a sequence in which the plurality of data blocks were recorded onto the recording medium, wherein the judging unit judges, in succession, the plurality of data blocks in the sequence shown by the sequence information, as needing to be nullified.

With this construction, the plurality of data blocks are judged, in the recording sequence, as needing to be nullified.

This allows only new data to be retained on the recording medium.

Here, the target data may be data which is continuously transmitted from an external device and recorded on the recording medium, wherein the data nullification device further includes: a receiving unit operable to receive data from the external device, and having set the received data as a new data block, the nullifying unit writes the new data block to a recording area on the recording medium that stores a data block which is judged as needing to be nullified, to nullify the recorded data block and at the same time record the new data block.

With this construction, the new data block is written to the recording area of the old data block which is judged as needing to be nullified.

In other words, recording the new data block has the effect of nullifying the old data block. Accordingly, the load on the device hardly increases despite the execution of the nullification.

Here, each data block may have a length corresponding to a fixed transmission time period, wherein a specified number of recording areas which are each used as a recording area of a data block are reserved on the recording medium.

With this construction, the specified number of recording areas each for recording data of the fixed transmission time period is reserved on the recording medium.

Here, if the length corresponding to the fixed transmission time period is variable and if part of the recorded data block remains even after the new data block is written, the nullifying unit may further write arbitrary data over the part of the recorded data block.

With this construction, arbitrary data is written over the part of the old data block which was not destroyed by the overwriting with the new data block.

This enables the whole old data block to be destroyed.

Here, if there is not a new data block which is to be recorded, the nullifying unit may write arbitrary data to the recording area.

With this construction, even when there is not a new data block, arbitrary data is written over each old data block.

This enables each old data block to be destroyed.

Here, the recording medium may store time limit information showing a recording time limit of each data block recorded on the recording medium, the recording time limit being a time limit after which retention of the data block on the recording medium is prohibited, wherein the judging unit judges that each data block whose recording time limit is reached needs to be nullified, based on the time limit information, and whenever any data block is judged as needing to be nullified because a recording time limit of the data block is reached, the nullifying unit nullifies the data block irrespective of whether the predetermined number of data blocks are judged as needing to be nullified or whether one or more data blocks whose total amount of data reaches the predetermined amount are judged as needing to be nullified.

With this construction, each data block whose recording time limit is reached is judged as needing to be nullified.

Since each data block is nullified based on its recording time limit, it is possible to make such setting that gives a priority to each data block. This increases flexibility.

Here, the data nullification device may further include: a utilizing unit operable to utilize the target data recorded on the recording medium, in units of data blocks, wherein the judging unit further judges that each data block which was utilized by the utilizing unit needs to be nullified.

With this construction, each utilized data block is judged as needing to be nullified.

This improves user-friendliness without departing from the principle of copy prohibition.

Here, the data nullification device may further include: a utilizing unit operable to utilize the target data recorded on the recording medium, in units of data blocks, wherein the judging unit judges that each data block which was utilized by the utilizing unit needs to be nullified.

With this construction, each utilized data block is judged as needing to be nullified.

Since each data block which was reproduced, copied, or moved is nullified, user-friendliness can be improved without departing from the principle of copy prohibition.

Here, the target data may be content data which is transmitted from an external device and recorded on the recording medium, wherein the content data is accompanied with copy control information showing whether copying of the content data is permitted or prohibited, the utilizing unit reproduces the content data recorded on the recording medium, in units of data blocks, and only if the copy control information accompanying the content data shows that the copying of the content data is prohibited, the judging unit judges that each data block which was reproduced by the utilizing unit needs to be nullified.

With this construction, if the copy control information shows that the copying of the content data is prohibited, each reproduced data block is judged as needing to be nullified.

In other words, when the content data is "Copy Never", a copy of the content data is allowed but then the copy is reliably nullified.

Here, the target data may be accompanied with copy control information showing whether copying of the target data is permitted or prohibited, wherein the utilizing unit records the target data recorded on the recording medium, to another recording medium, in units of data blocks, and only if the copy control information accompanying the target data shows that the copying of the target data is prohibited, the judging unit judges that each data block on the recording medium which was recorded by the utilizing unit needs to be nullified.

With this construction, if the copy control information shows that the copying of the content data is prohibited, each copied data block is judged as needing to be nullified.

In other words, when the content data is "Copy No more", a second generation copy of the content data is allowed but then a first generation copy of the content data is reliably nullified.

Here, the nullifying unit may destroy all parts of a data block which is judged as needing to be nullified.

With this construction, all parts of the data block judged as needing to be nullified are destroyed.

This enhances security.

Here, the nullifying unit may destroy at least a part of a data block which is judged as needing to be nullified, the part of the data block being necessary to utilize remaining parts of the data block.

With this construction, at least the part of the data block which is needed to utilize the other parts of the data block is destroyed.

This makes the data block unusable while minimizing the increase in the load of the device.

Here, the target data may be MPEG data including I pictures, wherein the part of the data block necessary to utilize the remaining parts of the data block is an I picture.

With this construction, the part of the data block which is needed to utilize the other parts of the data block is an I picture in MPEG data.

B pictures and P pictures cannot be utilized if the I picture which these B pictures and P pictures refer to is destroyed. By destroying only the I picture while leaving the B and P pictures as they are, the increase in the load of the device is reduced.

Here, the target data may be MPEG data including I pictures, wherein the part of the data block necessary to utilize the remaining parts of the data block is a first sector of an I picture.

With this construction, the part of the data block which is needed to utilize the other parts of the data block is the first sector of the I picture.

This makes it impossible to properly reproduce the I picture, so that the remaining B and P pictures cannot be reproduced. Thus, by destroying only the first sector of the I picture, the increase in the load of the device can be reduced.

Here, when the data nullification device does not have enough processing capacity, the nullifying unit may destroy only the part of the data block necessary to utilize the remaining parts of the data block.

With this construction, when there is not enough processing capacity, only the part of the data block which is needed to utilize the other parts is destroyed.

This enhances security without increasing the load of the device.

Here, the nullifying unit may destroy the remaining parts of the data block within a range where a processing capacity of the data nullification device allows.

With this construction, the other parts of the data block are destroyed within a range where the processing capacity of the device allows.

This enhances security without increasing the load of the device.

Here, the data nullification device may further include: a destroying unit operable to destroy remaining parts of data blocks which were not destroyed by the nullifying unit, when the data nullification device has an enough processing capacity.

With this construction, when there is enough processing capacity, remaining parts of data blocks which were not destroyed by the nullifying unit are all destroyed.

This enhances security without increasing the load of the device.

Here, each data block recorded on the recording medium may be encrypted using an individual encryption key, wherein a decryption key for decrypting the encrypted data block is stored on the recording medium, and the nullifying unit destroys at least a decryption key corresponding to a data block which is judged as needing to be nullified.

With this construction, at least the decryption key corresponding to the data block is destroyed. As a result, the data block remaining on the recording medium becomes unusable, since the data block cannot be decrypted without the decryption key.

Thus, the data block is made unusable with a minimum increase in the load of the device.

Here, the data nullification device may further include: an acquiring unit operable to acquire the target data in an encoded form; a decoding unit operable to decode the encoded target data using a user key which has been provided to authorized users in advance, to obtain the target data; a key generating unit operable to generate an arbitrary encryption key and a decryption key corresponding to the encryption key, for each data block of the target data; a data encrypting unit operable to encrypt the data block using the encryption key so that the encrypted data block can be decrypted using the corresponding decryption key; a key encrypting unit operable to encrypt the decryption key using an identifier unique to the data nullification device; and a recording unit operable to record the encrypted data block and the encrypted decryption key onto the recording medium.

With this construction, the encoded target data is decoded using the user key, and each data block of the decoded target data is encrypted using an encryption key. Further, a decryption key corresponding to the encryption key is encrypted using an identifier unique to the device, and the encrypted data block and the encrypted decryption key are recorded onto the recording medium.

Since the encrypted decryption key cannot be decrypted without the identifier unique to the device and so cannot be used by other devices, security can be enhanced.

Here, at least the decoding unit, the key generating unit, the data encrypting unit, and the key encrypting unit may be contained in a single semiconductor chip.

With this construction, the decoding unit, the key generating unit, the data encrypting unit, and the key encrypting unit can be contained in the same semiconductor chip. This keeps the target data in an unencrypted form from being transferred over wiring of a circuit board.

In other words, an unauthorized user cannot retrieve the unencrypted target data during the operation. This enhances security.

The stated object can also be achieved by a data nullification program for nullifying target data recorded on a recording medium, the target data being made up of a plurality of data blocks, the data nullification program having a computer execute the steps of: judging, for each data block recorded on the recording medium, whether the data block needs to be nullified; and nullifying, when a predetermined number of data blocks are judged as needing to be nullified or when one or more data blocks whose total amount of data reaches a predetermined amount are judged as needing to be nullified, the judged data blocks.

With this construction, when a predetermined number of data blocks satisfy a specific condition or one or more data blocks whose total amount of data reaches a predetermined amount satisfy the specific condition, the data blocks are nullified.

Accordingly, when the target data is marked as "Copy Never" or "Copy No more", a copy can be made but then the copy or the original is reliably nullified. In this way, user-friendliness can be improved without departing from the principle of copy prohibition.

Also, since the target data is nullified in a predetermined data unit, even if an unauthorized user tries to obtain the copy by powering off the device halfway through the operation, he or she cannot obtain the whole target data. By employing an appropriate data unit for the nullification, security can be improved.

Here, the recording medium may store sequence information that shows a sequence in which the plurality of data blocks were recorded onto the recording medium, wherein the judging step judges, in succession, the plurality of data blocks in the sequence shown by the sequence information, as needing to be nullified.

With this construction, the plurality of data blocks are judged, in the recording sequence, as needing to be nullified.

This allows only new data to be retained on the recording medium.

Here, the target data may be data which is continuously transmitted from an external device and recorded on the recording medium, wherein the data nullification program further having the computer execute the step of: receiving data from the external device, and having set the received data as a new data block, the nullifying step writes the new data block to a recording area on the recording medium that stores a data block which is judged as needing to be nullified, to nullify the recorded data block and at the same time record the new data block.

With this construction, the new data block is written to the recording area of the old data block which is judged as needing to be nullified.

In other words, recording the new data block has the effect of nullifying the old data block. Accordingly, the load on the device hardly increases despite the execution of the nullification.

Here, the recording medium may store time limit information showing a recording time limit of each data block recorded on the recording medium, the recording time limit being a time limit after which retention of the data block on the recording medium is prohibited, wherein the judging step judges that each data block whose recording time limit is reached needs to be nullified, based on the time limit information, and whenever any data block is judged as needing to be nullified because a recording time limit of the data block is reached, the nullifying step nullifies the data block irrespective of whether the predetermined number of data blocks are judged as needing to be nullified or whether one or more data blocks whose total amount of data reaches the predetermined amount are judged as needing to be nullified.

With this construction, each data block whose recording time limit is reached is judged as needing to be nullified.

Since each data block is nullified based on its recording time limit, it is possible to make such setting that gives a priority to each data block. This increases flexibility.

Here, the data nullification program may further have the computer execute the step of: utilizing the target data recorded on the recording medium, in units of data blocks, wherein the judging step further judges that each data block which was utilized in the utilizing step needs to be nullified.

With this construction, each utilized data block is judged as needing to be nullified.

This improves user-friendliness without departing from the principle of copy prohibition.

Here, the data nullification program may further have the computer execute the step of: utilizing the target data recorded on the recording medium, in units of data blocks, wherein the judging step judges that each data block which was utilized in the utilizing step needs to be nullified.

With this construction, each utilized data block is judged as needing to be nullified.

Since each data block which was reproduced, copied, or moved is nullified, user-friendliness can be improved without departing from the principle of copy prohibition.

Here, the nullifying step may destroy all parts of a data block which is judged as needing to be nullified.

With this construction, all parts of the data block judged as needing to be nullified are destroyed.

This enhances security.

Here, the nullifying step may destroy at least a part of a data block which is judged as needing to be nullified, the part of the data block being necessary to utilize remaining parts of the data block.

With this construction, at least the part of the data block which is needed to utilize the other parts of the data block is destroyed.

This makes the data block unusable while minimizing the increase in the load of the device.

Here, each data block recorded on the recording medium may be encrypted using an individual encryption key, wherein a decryption key for decrypting the encrypted data block is stored on the recording medium, and the nullifying step destroys at least a decryption key corresponding to a data block which is judged as needing to be nullified.

With this construction, at least the decryption key corresponding to the data block is destroyed. As a result, the data block remaining on the recording medium becomes unusable, since the data block cannot be decrypted without the decryption key.

Thus, the data block is made unusable with a minimum increase in the load of the device.

The stated object can also be achieved by a data nullification method for nullifying target data recorded on a recording medium, the target data being made up of a plurality of data blocks, the data nullification method including the steps of: judging, for each data block recorded on the recording medium, whether the data block needs to be nullified; and nullifying, when a predetermined number of data blocks are judged as needing to be nullified or when one or more data blocks whose total amount of data reaches a predetermined amount are judged as needing to be nullified, the judged data blocks.

With this construction, when a predetermined number of data blocks satisfy a specific condition or one or more data blocks whose total amount of data reaches a predetermined amount satisfy the specific condition, the data blocks are nullified.

Accordingly, when the target data is marked as "Copy Never" or "Copy No more", a copy can be made but then the copy or the original is reliably nullified. In this way, user-friendliness can be improved without departing from the principle of copy prohibition.

Also, since the target data is nullified in a predetermined data unit, even if an unauthorized user tries to obtain the copy by powering off the device halfway through the operation, he or she cannot obtain the whole target data. By employing an appropriate data unit for the nullification, security can be improved.

Here, the recording medium may store sequence information that shows a sequence in which the plurality of data blocks were recorded onto the recording medium, wherein the judging step judges, in succession, the plurality of data blocks in the sequence shown by the sequence information, as needing to be nullified.

With this construction, the plurality of data blocks are judged, in the recording sequence, as needing to be nullified.

This allows only new data to be retained on the recording medium.

Here, the target data may be data which is continuously transmitted from an external device and recorded on the recording medium, wherein the data nullification method further includes the step of: receiving data from the external device, and wherein having set the received data as a new data block, the nullifying step writes the new data block to a recording area on the recording medium that stores a data block which is judged as needing to be nullified, to nullify the recorded data block and at the same time record the new data block.

With this construction, the new data block is written to the recording area of the old data block which is judged as needing to be nullified.

In other words, recording the new data block has the effect of nullifying the old data block. Accordingly, the load on the device hardly increases despite the execution of the nullification.

Here, the recording medium may store time limit information showing a recording time limit of each data block recorded on the recording medium, the recording time limit being a time limit after which retention of the data block on the recording medium is prohibited, wherein the judging step judges that each data block whose recording time limit is reached needs to be nullified, based on the time limit information, and whenever any data block is judged as needing to be nullified because a recording time limit of the data block is reached, the nullifying step nullifies the data block irrespective of whether the predetermined number of data blocks are judged as needing to be nullified or whether one or more data blocks whose total amount of data reaches the predetermined amount are judged as needing to be nullified.

With this construction, each data block whose recording time limit is reached is judged as needing to be nullified.

Since each data block is nullified based on its recording time limit, it is possible to make such setting that gives a priority to each data block. This increases flexibility.

Here, the data nullification method may further include the step of: utilizing the target data recorded on the recording medium, in units of data blocks, wherein the judging step further judges that each data block which was utilized in the utilizing step needs to be nullified.

With this construction, each utilized data block is judged as needing to be nullified.

This improves user-friendliness without departing from the principle of copy prohibition.

Here, the data nullification method may further include the step of: utilizing the target data recorded on the recording medium, in units of data blocks, wherein the judging step judges that each data block which was utilized in the utilizing step needs to be nullified.

With this construction, each utilized data block is judged as needing to be nullified.

Since each data block which was reproduced, copied, or moved is nullified, user-friendliness can be improved without departing from the principle of copy prohibition.

Here, the nullifying step may destroy all parts of a data block which is judged as needing to be nullified.

With this construction, all parts of the data block judged as needing to be nullified are destroyed.

This enhances security.

Here, the nullifying step may destroy at least a part of a data block which is judged as needing to be nullified, the part of the data block being necessary to utilize remaining parts of the data block.

With this construction, at least the part of the data block which is needed to utilize the other parts of the data block is destroyed.

This makes the data block unusable while minimizing the increase in the load of the device.

Here, each data block recorded on the recording medium may be encrypted using an individual encryption key, wherein a decryption key for decrypting the encrypted data block is stored on the recording medium, and the nullifying step destroys at least a decryption key corresponding to a data block which is judged as needing to be nullified.

With this construction, at least the decryption key corresponding to the data block is destroyed. As a result, the data block remaining on the recording medium becomes unusable, since the data block cannot be decrypted without the decryption key.

Thus, the data block is made unusable with a minimum increase in the load of the device.

BRIEF DESCRIPTION OF THE DRAWINGS

These and other objects, advantages and features of the invention will become apparent from the following description thereof taken in conjunction with the accompanying drawings which illustrate specific embodiments of the invention.

In the drawings.

DESCRIPTION OF THE PREFERRED EMBODIMENTS

First Embodiment (Overview)

The first embodiment of the present invention is the following device. When digital content which is copy-prohibited ("Copy Never") is received, the device allows the digital content to be recorded onto a recording medium, but nullifies the recorded digital content once the recorded digital content has been reproduced or a predetermined time period has passed from the time at which the digital content was recorded. This enables time shifting to be performed only for one reproduction or only within the predetermined time period after the reception.

(Construction)

Figure 1:
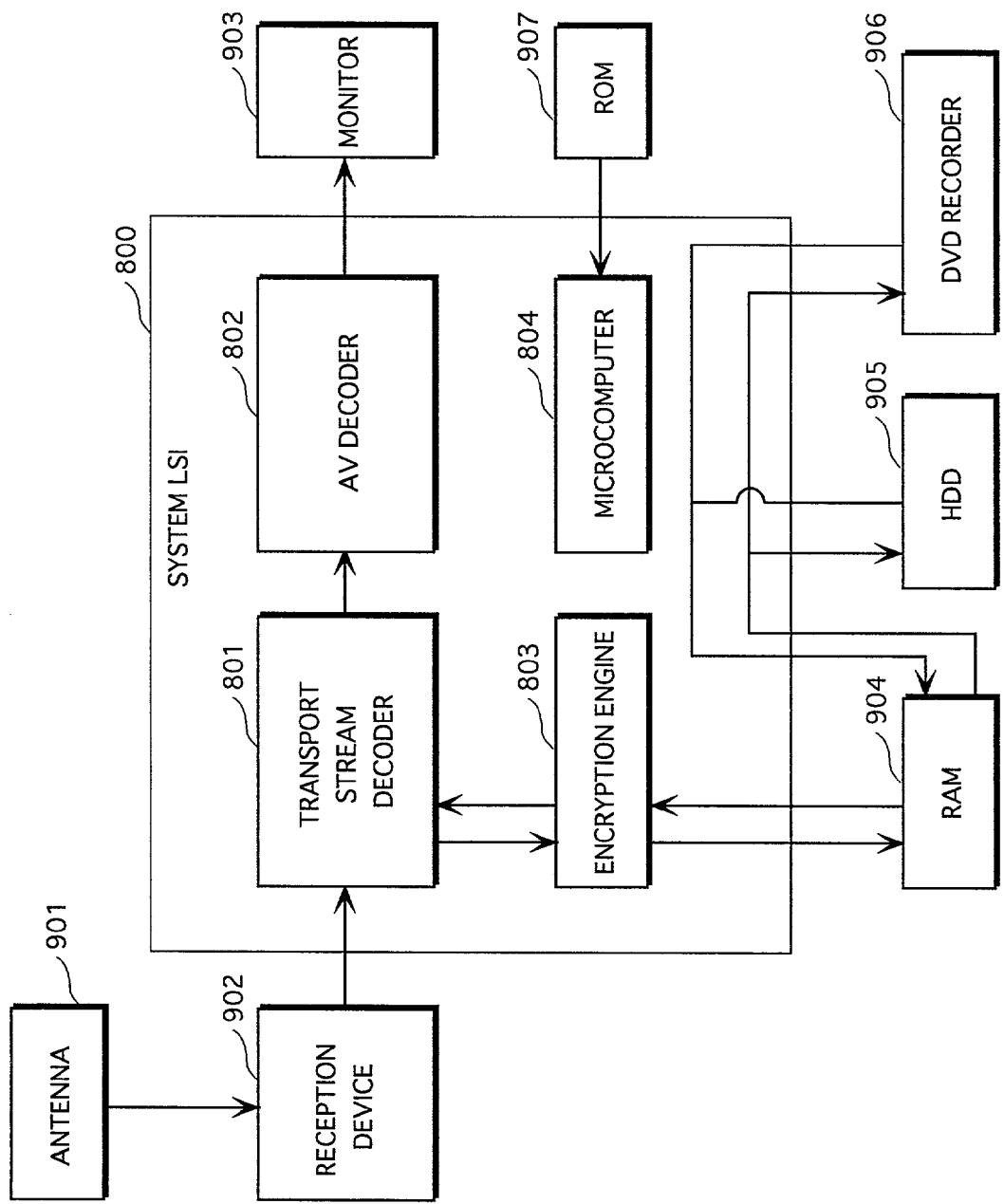
FIG. 1 shows an example hardware construction of a reception/reproduction/nullification system to which the first embodiment of the invention relates.

FIG. 1 shows an example hardware construction of a reception/reproduction/nullification system to which the first embodiment of the present invention relates.

In addition to a system LSI 800, the drawing shows an antenna 901, a reception device 902, a monitor 903, a RAM 904, an HDD 905, a DVD recorder 906, and a ROM 907 for purposes of illustration. The system LSI 800, the RAM 904, the HDD 905, and the ROM 907 are generally contained in the same case called an STB (set-top box).

The system LSI 800 includes a transport stream decoder 801, an AV decoder 802, an encryption engine 803, and a microcomputer 804. These construction elements are enclosed within the same semiconductor chip, to prevent unencrypted digital data which is obtained by decoding a transport stream from being transferred over wiring of a circuit board. This strengthens security.

The reception device 902 receives a desired carrier wave from a broadcast station via the antenna 901 and demodulates it, to produce a transport stream (hereafter a "TS stream") made up of packets storing desired digital content and control data for the digital content. If the desired digital content requires copyright protection, information that indicates prohibition of copies is attached to the digital content. As one example, copy control information "Copy Never" is attached to the digital content. The TS stream has a header unit and a payload unit. The header unit includes control information and the like and is unencrypted, whereas the payload unit includes data that need be delivered to its destination and is encrypted using a cipher called scrambling.

The transport stream decoder 801 descrambles the scrambled part of the generated TS stream using a descramble key which has been given to authorized users beforehand, and decodes the result. The transport stream decoder 801 also decodes the unscrambled part of the TS stream. Hence the transport stream decoder 801 obtains the desired digital content. As one example, the digital content obtained here is an MPEG stream of audio and video.

The AV decoder 802 generates a video output signal and an audio output signal from the digital content obtained by the transport stream decoder 801, and has the monitor 903 reproduce the video and audio.

The encryption engine 803 operates as follows. If the digital content requires copyright protection and yet need be recorded to a recording medium such as the RAM 904, the HDD 905, or the DVD recorder 906, the encryption engine 803 encrypts the digital content obtained by the transport stream decoder 801. Here, the digital content is handled in units of data blocks which each correspond to a predetermined broadcast time period expressed, for example, in minutes. The encryption engine 803 encrypts each data block using a randomly-generated encryption key. The encryption engine 803 also encrypts a decryption key corresponding to the encryption key using a device ID, and records the encrypted data block and the encrypted decryption key as a pair. To use the digital content, the encryption engine 803 decrypts the encrypted decryption key using the device ID, and decrypts the encrypted data block using the obtained decryption key. The device ID is a value which is unique to the semiconductor chip. In the present example, the device ID cannot be referred to from outside the semiconductor chip.

The microcomputer 804 controls the overall operation of the STB, by reading a control program stored on the ROM 907 and executing it. Here, the control program has been scrambled to prevent unauthorized users from altering it, so that the microcomputer 804 descrambles the control program before executing it.

Suppose the user who is viewing copy-prohibited digital content indicates time shifting for some reason. Then the microcomputer 804 exercises control so that the following three operations are simultaneously carried out repeatedly: (1) recording an encrypted data block to the HDD 905; (2) decrypting an encrypted data block which was recorded onto the HDD 905 a shift time earlier, and reproducing the decrypted data block; and (3) nullifying an encrypted data block on the HDD 905 which has just been reproduced so that the data block can no longer be reproduced.

Here, the encrypted data block is nullified once it has been reproduced, but this condition for nullification may be replaced by or used in combination with the condition of whether a predetermined time period has passed since the time at which the data block was recorded. Most movie films run about two hours. Accordingly, if the predetermined time period is set at around 90 minutes, it is highly possible to keep a whole movie film from being stored on a recording medium even in one second. As a result, even if the power is turned off halfway through the processing, the user cannot obtain the whole movie film in its entirety, and so cannot reproduce the whole movie film later. Hence time shifting can be performed only within the predetermined time period.

Figure 2:
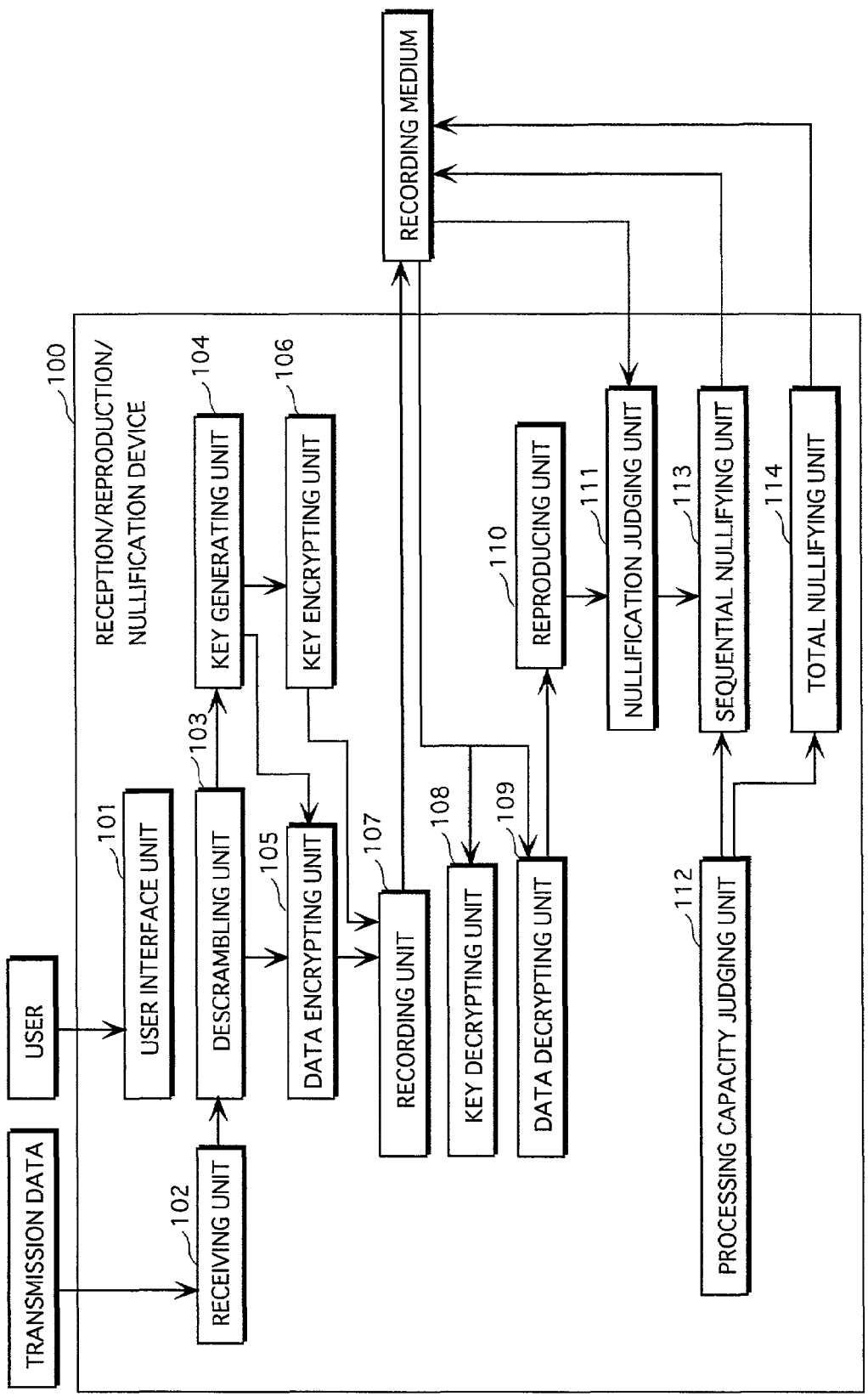
FIG. 2 is a functional block diagram of a reception/reproduction/nullification device of the first embodiment.

FIG. 2 is a functional block diagram of a reception/reproduction/nullification device of the first embodiment.

The reception/reproduction/nullification device 100 shown in the drawing includes a user interface unit 101, a receiving unit 102, a descrambling unit 103, a key generating unit 104, a data encrypting unit 105, a key encrypting unit 106, a recording unit 107, a key decrypting unit 108, a data decrypting unit 109, a reproducing unit 110, a nullification judging unit 111, a processing capacity judging unit 112, a sequential nullifying unit 113, and a total nullifying unit 114. In actuality, the function of the receiving unit 102 corresponds to the function of the reception device 902 shown in FIG. 1. The function of the descrambling unit 103 corresponds to the function of the transport stream decoder 801 in FIG. 1. The functions of the key generating unit 104, data encrypting unit 105, key encrypting unit 106, recording unit 107, key decrypting unit 108, and data decrypting unit 109 correspond to the function of the encryption engine 803 in FIG. 1. The function of the reproducing unit 110 corresponds to the function of the AV decoder 802 in FIG. 1. The functions of the nullification judging unit 111, processing capacity judging unit 112, sequential nullifying unit 113, and total nullifying unit 114 correspond to the function of the microcomputer 804 in FIG. 1.

It should be noted here that an explanation on functions which are not directly related to the present invention has been omitted in this specification for simplicity's sake, so that the following description may differ with the actual practice to some extent.

The user interface unit 101 receives various indications from the user. The indications include a view indication, a pause indication, a time shift indication, a stop indication, and an indication to move digital content.

The receiving unit 102 receives transmission data broadcast from a broadcast station or the like. In the present example, the receiving unit 102 receives digital content which has been scrambled and is accompanied with copy control information.

The descrambling unit 103 descrambles the scrambled digital content received by the receiving unit 102, using a descramble key which has been given to authorized users beforehand.

The key generating unit 104 operates as follows. While the user is indicating a pause, the key generating unit 104 arbitrarily generates a unique encryption key and a decryption key corresponding to the encryption key using a random number or the like, for each data block corresponding to the predetermined broadcast time period which is descrambled by the descrambling unit 103. Here, an algorithm that uses the same key for encryption and decryption is employed, so that an encryption key and a decryption key corresponding to the encryption key can be collectively referred to as a "unique key". For example, a unique key is randomly generated for each data block that corresponds to the broadcast time period of 10 minutes.

The data encrypting unit 105 operates as follows. While the user is indicating a pause, the data encrypting unit 105 encrypts each data block descrambled by the descrambling unit 103 using an encryption key generated by the key generating unit 104 for the data block, so that the encrypted data block can be decrypted using a decryption key corresponding to the encryption key. In the present example, each data block corresponding to the broadcast time period of 10 minutes is encrypted using a corresponding unique key.

The key encrypting unit 106 encrypts the decryption key corresponding to the encryption key used by the data encrypting unit 105, using the device ID. In the present example, the unique key is encrypted using the device ID.

The recording unit 107 records the data block encrypted by the data encrypting unit 105 and the decryption key encrypted by the key encrypting unit 106, to a predetermined recording medium as a pair. In the present example, the pair of encrypted data block corresponding to the broadcast time period of 10 minutes and encrypted unique key is recorded to the HDD 905. Here, if the digital content does not require copyright protection, the data block may be recorded in an unencrypted form.

The key decrypting unit 108 operates as follows. While the user is indicating time shifting, the key decrypting unit 108 reads an encrypted decryption key corresponding to each encrypted data block which is to be reproduced, from the recording medium. The key decrypting unit 108 then decrypts the encrypted decryption key using the device ID. In the present example, an encrypted unique key that is paired with each encrypted data block which was recorded a shift time earlier (hereafter a "shift-time-old data block") is decrypted using the device ID.

The data decrypting unit 109 operates as follows. While the user is indicating time shifting, the data decrypting unit 109 decrypts each encrypted data block to be reproduced, using a corresponding decryption key decrypted by the key decrypting unit 108. In the present example, each shift-time-old data block is decrypted using a corresponding unique key.

The reproducing unit 110 operates as follows. While the user is indicating viewing, the reproducing unit 110 reproduces each data block descrambled by the descrambling unit 103. While the user is indicating time shifting, the reproducing unit 110 reproduces each data block decrypted by the data decrypting unit 109.

The nullification judging unit 111 operates as follows. When digital content is received and recorded despite its copy prohibition status, the nullification judging unit 111 judges, for each pair of encrypted data block and encrypted decryption key recorded on the recording medium, whether the pair should be nullified, based on a specific condition. In the present example, the nullification judging unit 111 judges, for each pair of encrypted data block corresponding to the broadcast time period of 10 minutes and encrypted unique key which are recorded on the HDD 905, whether the pair should be nullified.

The specific condition here is whether the data block has been reproduced by the reproducing unit 110, or whether a predetermined time period has passed from the time at which the data block was received by the receiving unit 102 or recorded by the recording unit 107. In the case where the lapse of the predetermined time period is used as the condition for nullification, the recording unit 107 records time limit information to the recording medium together with each pair of encrypted data block and encrypted decryption key. The time limit information shows the reception time or recording time of the data block, and is used to manage the recording time limit of the data block. The nullification judging unit 111 judges whether the recording time limit is reached, according to this time limit information.

The processing capacity judging unit 112 judges whether the device 100 has sufficient processing capacity to destroy all parts of the data block which includes data relating to the digital content and is judged as needing to be nullified.

The sequential nullifying unit 113 operates as follows. When the nullification judging unit 111 judges that a predetermined number of encrypted data blocks and their corresponding encrypted decryption keys should be nullified or that one or more encrypted data blocks whose total amount of data reaches a predetermined amount and their corresponding encrypted decryption keys should be nullified, the sequential nullifying unit 113 nullifies the judged pairs of encrypted data blocks and encrypted decryption keys. Here, the predetermined number is an integer no less than 1.

To nullify a pair of encrypted data block and encrypted decryption key by the sequential nullifying unit 113 means to make the pair on the recording medium unusable. Ordinary data deletion merely deletes link information of a data file or rewrites several bits of the header unit of the data file, so that the data unit of the data file remains as it is. This being so, the data can be recovered in some cases even after it is supposed to be deleted. Such data deletion cannot be regarded as making the data unusable. On the other hand, the nullification performed by the sequential nullifying unit 113 destroys the pair of encrypted data block and encrypted decryption key itself, by writing arbitrary data to a recording area of the pair or by initializing the recording area.

Here, the sequential nullifying unit 113 may destroy both the encrypted data block and the encrypted decryption key. In reality, however, writing arbitrary data of the same size over each pair which is judged as needing to be nullified may cause a problem to the processing capacity of the device 100.

For instance, in time shifting it is necessary to simultaneously perform the following two sequence of operations. The first sequence of operations is receiving, descrambling, encrypting, and recording broadcast digital content. The second sequence of operations is reading, decrypting, and reproducing recorded digital content. This puts a heavy load on the control system, the recording medium, and the like. This being so, to further execute an operation of writing arbitrary data of the same size over each pair which needs to be nullified, it is necessary to increase the processing capacity of the device 100 or to restrict other functions.

However, the act of nullifying data itself does not contribute user convenience at all. For this reason, it is undesirable to increase the processing capacity which would cause an increase in cost, or to limit other functions.

Accordingly, the sequential nullifying unit 113 may destroy at least an important part of the pair of encrypted data block and encrypted decryption key. The important part referred to here is data that is necessary to reproduce the other parts of the pair. In more detail, the important part is the decryption key. In the case of MPEG data, the important part is an I picture or the first sector of such an I picture.

As an alternative, the sequential nullifying unit 113 may destroy all parts of the pair when the processing capacity judging unit 112 judges that there is enough processing capacity, and destroy only the important part of the pair when the processing capacity judging unit 112 judges that there is not enough processing capacity.

The total nullifying unit 114 destroys all remaining parts of the pairs of encrypted data blocks and encrypted decryption keys which have not been destroyed by the sequential nullifying unit 113, when there is enough processing capacity. Also, when the user indicates to stop time shifting, the total nullifying unit 114 destroys all remaining parts which have not been destroyed.

First Operation Example

Figure 3:
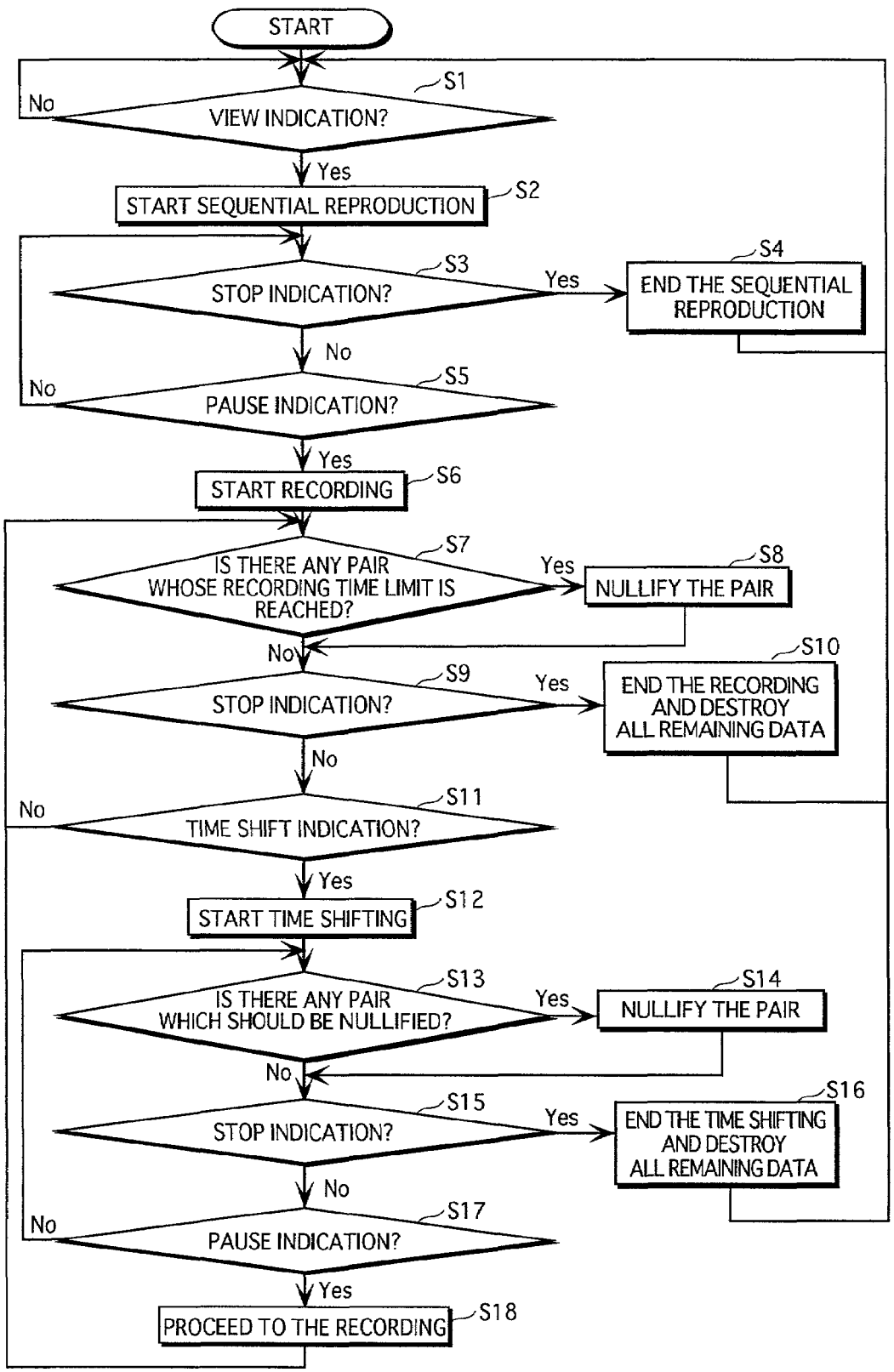
FIG. 3 shows an example operation of the reception/reproduction/nullification device of the first embodiment.

FIG. 3 shows an example operation of the reception/reproduction/nullification device 100 of the first embodiment.

Sequential reproduction, recording, time shifting, and nullifying of the present invention are explained with reference to FIG. 3.

(1) In the stopped state, the user interface unit 101 waits for receiving the user's indication to view some program (S1).

(2) Upon receiving the view indication (S1:Yes), the sequential reproduction starts (S2).

The receiving unit 102 starts receiving transmission data of the program which the user wants to view. In the present example, scrambled digital content with copy control information "Copy Never" is received.

The descrambling unit 103 starts descrambling the scrambled digital content received by the receiving unit 102.

The reproducing unit 110 starts reproducing the digital content descrambled by the descrambling unit 103.

(3) During the sequential reproduction, the user interface unit 101 waits for the user's indication to stop (S3).

(4) Upon receiving the stop indication (S3:Yes), the operations of the receiving unit 102, descrambling unit 103, and reproducing unit 110 are stopped to end the sequential reproduction and return to the stopped state (S4).

(5) During the sequential reproduction, the user interface unit 101 waits for the user's indication to pause (S5).

(6) Upon receiving the pause indication (S5:Yes), the recording starts (S6).

The key generating unit 104 randomly generates an encryption key and a decryption key corresponding to the encryption key using a random number or the like, for each data block corresponding to the predetermined broadcast time period which is descrambled by the descrambling unit 103. In the present example, a unique key is randomly generated for each data block corresponding to the broadcast time period of 10 minutes.

The data encrypting unit 105 encrypts the data block descrambled by the descrambling unit 103 using the encryption key generated by the key generating unit 104, so that the encrypted data block can be decrypted using the corresponding decryption key. In the present example, the data block corresponding to the broadcast time period of 10 minutes is encrypted using the unique key.

The key encrypting unit 106 encrypts the decryption key corresponding to the encryption key used by the data encrypting unit 105, using the device ID. In the present example, the unique key is encrypted using the device ID.

The recording unit 107 records the data block encrypted by the data encrypting unit 105 and the decryption key encrypted by the key encrypting unit 106, to the recording medium. In the present example, the pair of encrypted data block corresponding to the broadcast time period of 10 minutes and encrypted unique key is recorded to the HDD 905.

The reproducing unit 110 stops the sequential reproduction of the digital content.

(7) During the recording, the nullification judging unit 111 judges, for each pair of encrypted data block and encrypted decryption key recorded on the recording medium, whether the recording time limit of the pair is reached. In the present example, the recording time limit is set at 90 minutes, so that once 90 minutes have passed since a pair of encrypted data block corresponding to the broadcast time period of 10 minutes and encrypted unique key was recorded onto the HDD 905, the nullification judging unit 111 judges that the recording time limit of the pair is reached (S7).

(8) When the recording time limit of the pair is reached, the sequential nullifying unit 113 writes arbitrary data to a recording area of the encrypted decryption key to nullify the pair. Here, if the processing capacity judging unit 112 judges that there is an enough processing capacity, the sequential nullifying unit 113 further writes arbitrary data to a recording area of the encrypted data block (S8).

(9) During the recording, the user interface unit 101 waits for the user's indication to stop (S9).

(10) Upon receiving the stop indication (S9:Yes), the operations of the receiving unit 102, descrambling unit 103, key generating unit 104, data encrypting unit 105, key encrypting unit 106, and recording unit 107 are stopped to end the recording. Also, the total nullifying unit 114 destroys all remaining data which has not been destroyed by the sequential nullifying unit 113, before returning to the stopped state (S10).

(11) During the recording, the user interface unit 101 waits for the user's indication to perform time shifting (S11).

(12) Upon receiving the time shift indication (S11:Yes), the time shifting starts (S12).

The key decrypting unit 108 reads an encrypted decryption key paired with each shift-time-old data block from the recording medium, and decrypts the encrypted decryption key using the device ID. In the present example, the shift time is 30 minutes, so that an encrypted unique key which is paired with each encrypted data block that was recorded 30 to 20 minutes earlier is decrypted. If the shift time is longer than the recording time limit, time shifting cannot be performed, as the shift-time-old data block has already been nullified by the time the time shifting starts. In such a case, the shift time is set as the recording time limit to continue the operation.

The data decrypting unit 109 decrypts the encrypted data block using the decryption key decrypted by the key decrypting unit 108. In the present example, the encrypted data block that was recorded 30 to 20 minutes earlier is decrypted using the decrypted unique key.

The reproducing unit 110 reproduces the data block decrypted by the data decrypting unit 109.

(13) During the time shifting, the nullification judging unit 111 judges, for each pair of encrypted data block and encrypted decryption key recorded on the recording medium, whether the recording time limit of the pair is reached or whether the data block has been reproduced by the reproducing unit 110. In the present example, the recording time limit is 90 minutes, so that the nullification judging unit 111 judges, for each pair of encrypted data block corresponding to the broadcast time period of 10 minutes and encrypted unique key which are recorded on the HDD 905, whether 90 minutes have passed since the recording or whether the data block has been reproduced (S13).

(14) When the pair is judged as needing to be nullified, the sequential nullifying unit 113 writes arbitrary data to a recording area of the encrypted decryption key to nullify the pair. Here, if the processing capacity judging unit 112 judges that there is an enough processing capacity, the sequential nullifying unit 113 further writes arbitrary data to a recording area of the encrypted data block (S14).

(15) During the time shifting, the user interface unit 101 waits for the user's indication to stop (S15).

(16) Upon receiving the stop indication (S15:Yes), the operations of the receiving unit 102, descrambling unit 103, key generating unit 104, data encrypting unit 105, key encrypting unit 106, recording unit 107, key decrypting unit 108, data decrypting unit 109, and reproducing unit 110 are stopped to end the time shifting. Also, the total nullifying unit 114 destroys all remaining data which has not been destroyed by the sequential nullifying unit 113, before returning to the stopped state (S16).

(17) During the time shifting, the user interface unit 101 waits for the user's indication to pause (S17).

(18) Upon receiving the pause indication (S17:Yes), the operations of the key decrypting unit 108, data decrypting unit 109, and reproducing unit 110 are stopped, while the recording continues (S18).

Second Operation Example

In the first operation example, the recording is not performed during the sequential reproduction. Instead, upon receiving the user's indication to pause, the sequential reproduction is stopped and the recording is commenced. In the second operation example, on the other hand, the recording is performed during the sequential reproduction, so as to make it possible to perform time shifting even if the user does not indicate to pause. Moreover, an automatic pause clear function is added in the second operation example. This function automatically clears the pause when the pause time reaches an upper limit, and proceeds to the time shifting.

Figure 4:
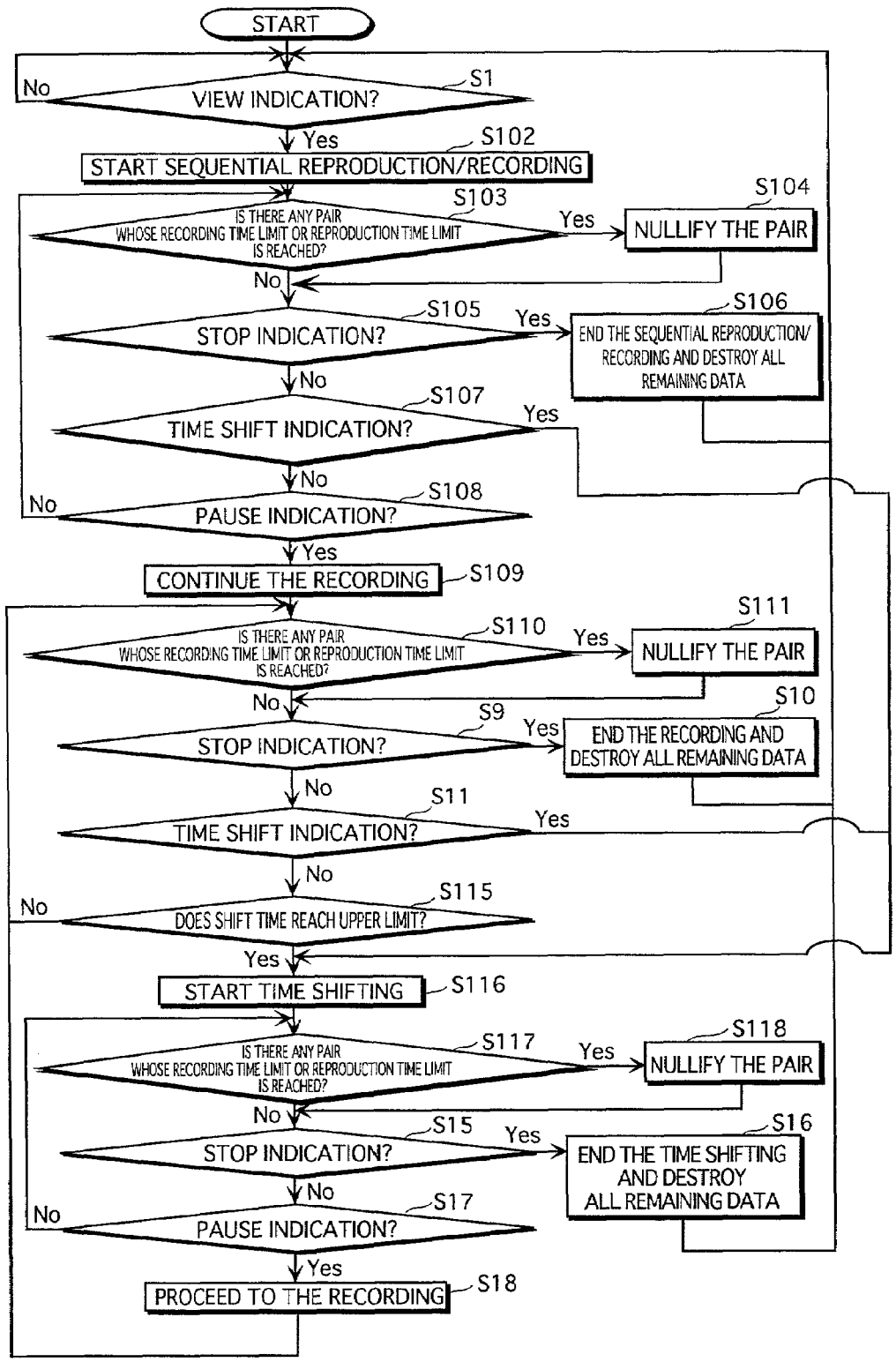
FIG. 4 shows another example operation of the reception/reproduction/nullification device of the first embodiment.

FIG. 4 shows another example operation of the reception/reproduction/nullification device 100 of the first embodiment.

Here, it is assumed that digital content received by the receiving unit 102 is accompanied with information showing a recording time limit and a reproduction time limit.

The recording time limit is a time period which begins when a pair is recorded and after which the retention of the pair on the recording medium is prohibited. The reproduction time limit is a time period which begins when a pair is first reproduced and after which the retention of the pair on the recording medium is prohibited. A pair whose recording time limit or reproduction time limit is reached is judged as needing to be nullified.

Sequential reproduction/recording, recording, time shifting, nullification, and automatic pause clearing of the present invention are explained by referring to FIG. 4. Note here that steps which are the same as those in the first operation example are given the same step numbers.

(1) In the stopped state, the user interface unit 101 waits for the user's indication to view some program (S1).

(2) Upon receiving the view indication (S1:Yes), the sequential reproduction/recording starts (S102).

The receiving unit 102 starts receiving transmission data of the program which the user wants to view. In the present example, scrambled digital content with copy control information "Copy Never" is received.

The descrambling unit 103 starts descrambling the scrambled digital content received by the receiving unit 102.

The reproducing unit 110 starts reproducing the digital content descrambled by the descrambling unit 103.

The key generating unit 104 randomly generates an encryption key and a decryption key corresponding to the encryption key using a random number or the like, for each data block corresponding to the predetermined broadcast time period which is descrambled by the descrambling unit 103. In the present example, a unique key is randomly generated for each data block corresponding to the broadcast time period of 10 minutes.

The data encrypting unit 105 encrypts the descrambled data block using the encryption key generated by the key generating unit 104, so that the encrypted data block can be decrypted using the corresponding decryption key. In the present example, the data block corresponding to the broadcast time period of 10 minutes is encrypted using the corresponding unique key.

The key encrypting unit 106 encrypts the decryption key corresponding to the encryption key used by the data encrypting unit 105, using the device ID. In the present example, the unique key is encrypted using the device ID.

The recording unit 107 records the data block encrypted by the data encrypting unit 105 and the decryption key encrypted by the key encrypting unit 106, to the recording medium. In the present example, the pair of encrypted data block corresponding to the broadcast time period of 10 minutes and encrypted unique key is recorded to the HDD 905.

Here, the pair is accompanied with the recording time limit and the reproduction time limit together with time limit information. When the data block is first reproduced, the time at which the data block is first reproduced is added to the time limit information.

(3) During the sequential reproduction/recording, the nullification judging unit 111 refers to time limit information to judge, for each pair of encrypted data block and encrypted decryption key recorded on the recording medium, whether the recording time limit of the pair is reached. Also, the nullification judging unit 111 judges, for each pair of encrypted data block and encrypted decryption key which has been reproduced, whether the reproduction time limit of the pair is reached. In the present example, the recording time limit is set at 90 minutes after the recording, and the reproduction time limit is set at 60 minutes after the first reproduction. This being so, when 90 minutes have passed since a pair of encrypted data block corresponding to the broadcast time period of 10 minutes and encrypted unique key was recorded, the recording time limit of the pair is judged as being reached.

Also, when 60 minutes have passed since the pair was first reproduced, the reproduction time limit of the pair is judged as being reached (S103).

(4) When there is any pair of encrypted data block and encrypted decryption key whose recording time limit or reproduction time limit is reached, the sequential nullifying unit 113 writes arbitrary data to a recording area of the encrypted decryption key to nullify the pair. Here, if the processing capacity judging unit 112 judges that there is an enough processing capacity, the sequential nullifying unit 113 further writes arbitrary data to a recording area of the encrypted data block (S104).

(5) During the sequential reproduction/recording, the user interface unit 101 waits for the user's indication to stop (S105).

(6) Upon receiving the stop indication (S105:Yes), the operations of the receiving unit 102, descrambling unit 103, reproducing unit 110, key generating unit 104, data encrypting unit 105, key encrypting unit 106, and recording unit 107 are stopped to end the sequential reproduction/recording. Also, the total nullifying unit 114 destroys all remaining data which has not been destroyed by the sequential nullifying unit 113, before returning to the stopped state (S106).

(7) During the sequential reproduction/recording, the user interface unit 101 waits for the user's indication to perform time shifting (S107).

(8) During the sequential reproduction/recording, the user interface unit 101 waits for the user's indication to pause (S108).

(9) Upon receiving the pause indication (S108:Yes), the reproduction is stopped while the recording continues (S109).

The reproducing unit 110 stops the sequential reproduction of the digital content.

(10) During the recording, the nullification judging unit 111 refers to time limit information to judge, for each pair of encrypted data block and encrypted decryption key recorded on the recording medium, whether the recording time limit of the pair is reached. Also, the nullification judging unit 111 judges, for each pair of encrypted data block and encrypted decryption key which has been reproduced, whether the reproduction time limit of the pair is reached (S110).

(11) When there is any pair of encrypted data block and encrypted decryption key whose recording time limit or reproduction time limit is reached, the sequential nullifying unit 113 writes arbitrary data to a recording area of the encrypted decryption key to nullify the pair. Here, if the processing capacity judging unit 112 judges that there is an enough processing capacity, the sequential nullifying unit 113 further writes arbitrary data to a recording area of the encrypted data block (S111).

(12) During the recording, the user interface unit 101 waits for the user's indication to stop (S9).

(13) Upon receiving the stop indication (S9:Yes), the operations of the receiving unit 102, descrambling unit 103, key generating unit 104, data encrypting unit 105, key encrypting unit 106, and recording unit 107 are stopped to end the recording. Also, the total nullifying unit 114 destroys all remaining data which has not been destroyed by the sequential nullifying unit 113, before returning to the stopped state (S10).

(14) During the recording, the user interface unit 101 waits for the user's indication to perform time shifting (S11).

(15) During the recording, the sequential nullifying unit 113 judges whether the shift time reaches an upper limit. If the shift time reaches the upper limit, the sequential nullifying unit 113 sets the shift time as the upper limit and automatically clears the pause, so that the time shifting is commenced (S115). In the present example, the upper limit is set at 90 minutes which are the same as the recording time limit. In this way, even if the recording time limit of data which has never been reproduced is reached, that data will not be nullified.

(16) When the automatic pause clearing occurs (S115:Yes) or when the time shift indication is received (S107:Yes, S11: Yes), the time shifting starts (S116).

The key decrypting unit 108 reads an encrypted decryption key paired with each shift-time-old data block from the recording medium, and decrypts the encrypted decryption key using the device ID. In the present example, the shift time is 30 minutes, so that an encrypted unique key paired with each data block which was recorded 30 to 20 minutes earlier is decrypted. Here, if the shift time exceeds the recording time limit, time shifting cannot be performed, as the shift-time-old data block has already been nullified by the time the time shifting starts. In this case, the shift time is set as the recording time limit to continue the operation.

The data decrypting unit 109 decrypts the encrypted data block using the decryption key decrypted by the key decrypting unit 108. In the present example, the encrypted data block of 30 to 20 minutes earlier is decrypted using the decrypted unique key.

The reproducing unit 110 reproduces the data block decrypted by the data decrypting unit 109.

(17) During the time shifting, the nullification judging unit 111 refers to time limit information to judge, for each pair of encrypted data block and encrypted decryption key recorded on the recording medium, whether the recording time limit of the pair is reached. Also, the nullification judging unit 111 judges, for each pair of encrypted data block and encrypted decryption key which has been reproduced, whether the reproduction time limit of the pair is reached (S117).

(18) When there is any pair of encrypted data block and encrypted decryption key whose recording time limit or reproduction time limit is reached, the sequential nullifying unit 113 writes arbitrary data to a recording area of the encrypted decryption key to nullify the pair. Here, if the processing capacity judging unit 112 judges that there is an enough processing capacity, the sequential nullifying unit 113 further writes arbitrary data to a recording area of the encrypted data block (S118).

(19) During the time shifting, the user interface unit 101 waits for the user's indication to stop (S15).

(20) Upon receiving the stop indication (S15:Yes), the operations of the receiving unit 102, descrambling unit 103, key generating unit 104, data encrypting unit 105, key encrypting unit 106, recording unit 107, key decrypting unit 108, data decrypting unit 109, and reproducing unit 110 are stopped to end the time shifting. Also, the total nullifying unit 114 destroys all remaining data which has not been destroyed by the sequential nullifying unit 113, before returning to the stopped state (S16).

(21) During the time shifting, the user interface unit 101 waits for the user's indication to pause (S17).

(22) Upon receiving the pause indication (S17:Yes), the operations of the key decrypting unit 108, data decrypting unit 109, and reproducing unit 110 are stopped, while the recording continues (S18).

According to the first embodiment of the present invention, copy-prohibited digital content can be recorded to enable time shifting, but the recorded digital content is promptly nullified to protect its copyright. This allows user-friendliness to be improved without departing from the principle of copy prohibition.

Second Embodiment (Overview)

The second embodiment of the present invention is the following device. When digital content which is copy-prohibited ("Copy Never") is received, the device allows the digital content to be recorded, but nullifies the recorded digital content once a predetermined time period has passed. Here, by writing new data blocks over old data blocks which need be nullified, the old data blocks which have been stored for more than the predetermined time period can be nullified without affecting the processing capacity of the device. As a result, time shifting can be performed only within the predetermined time period from the reception.

(Construction)

A reception/reproduction/nullification device of the second embodiment has the same hardware construction as that of the first embodiment.

Figure 5:
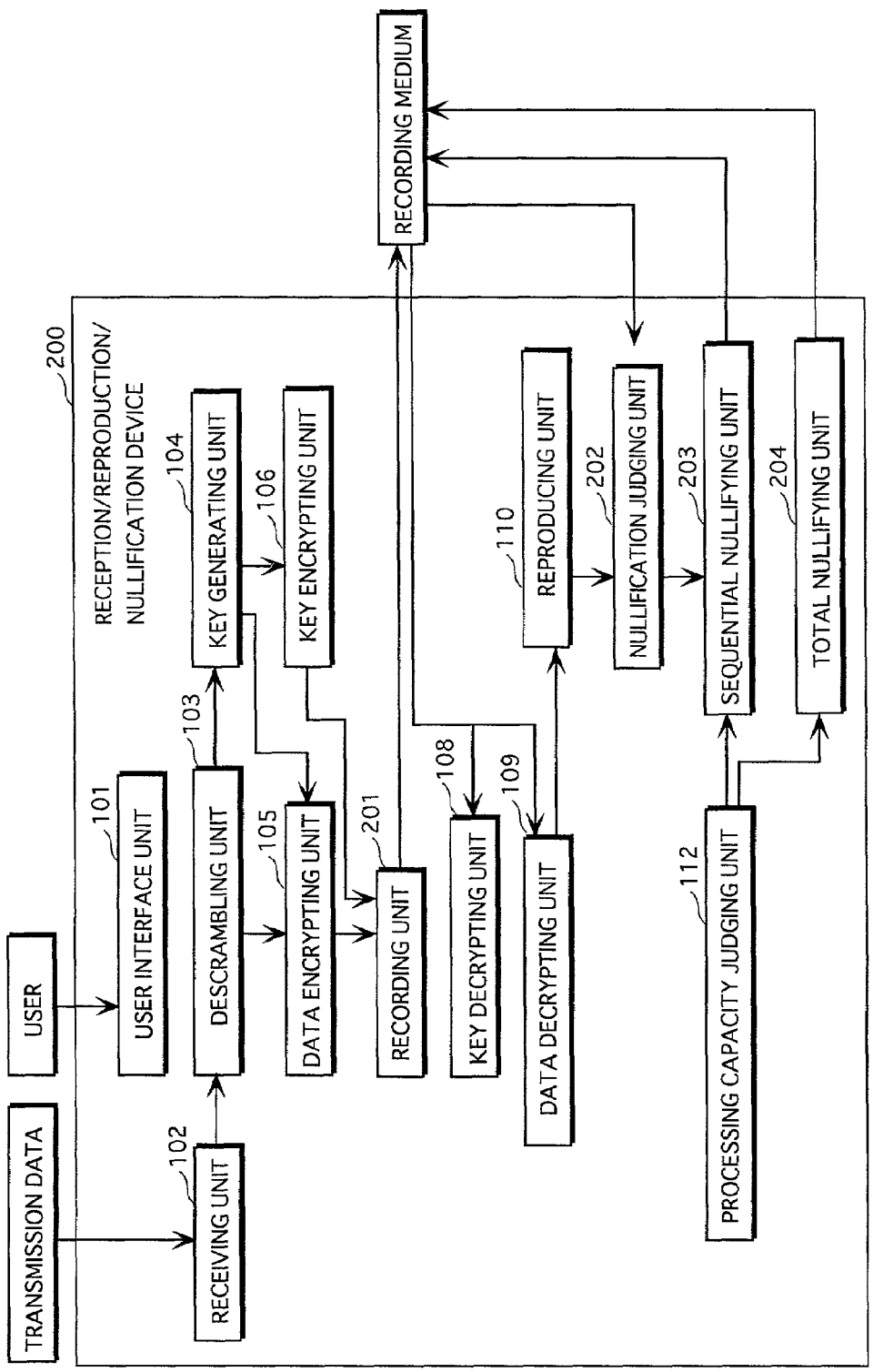
FIG. 5 is a functional block diagram of a reception/reproduction/nullification device of the second embodiment of the invention.

FIG. 5 is a functional block diagram of the reception/reproduction/nullification device of the second embodiment.

The reception/reproduction/nullification device 200 shown in the drawing includes the user interface unit 101, the receiving unit 102, the descrambling unit 103, the key generating unit 104, the data encrypting unit 105, the key encrypting unit 106, a recording unit 201, the key decrypting unit 108, the data decrypting unit 109, the reproducing unit 110, a nullification judging unit 202, the processing capacity judging unit 112, a sequential nullifying unit 203, and a total nullifying unit 204. In actuality, the function of the receiving unit 102 corresponds to the function of the reception device 902 shown in FIG. 1. The function of the descrambling unit 103 corresponds to the function of the transport stream decoder 801 in FIG. 1. The functions of the key generating unit 104, data encrypting unit 105, key encrypting unit 106, recording unit 201, key decrypting unit 108, and data decrypting unit 109 correspond to the function of the encryption engine 803 in FIG. 1. The function of the reproducing unit 110 corresponds to the function of the AV decoder 802 in FIG. 1. The functions of the nullification judging unit 202, processing capacity judging unit 112, sequential nullifying unit 203, and total nullifying unit 204 correspond to the function of the microcomputer 804 in FIG. 1.

Construction elements which are the same as those in the first embodiment are given the same reference numerals and their explanation has been omitted.

The recording unit 201 sequentially records pairs of encrypted data blocks and encrypted decryption keys of digital content, onto the predetermined recording medium. Here, if the digital content is copy-prohibited, the recording unit 201 reserves a plurality of recording areas that are each capable of storing data of the predetermined broadcast time period, on the recording medium. The recording unit 201 then sequentially records the pairs to the reserved recording areas. In the present example, the recording unit 201 reserves nine recording areas that can each store data corresponding to the broadcast time period of 10 minutes, on the HDD 905. The recording unit 201 then records pairs of encrypted data blocks and encrypted unique keys, sequentially to the reserved recording areas. Here, if the recording areas already store pairs of encrypted data blocks and encrypted unique keys, the recording unit 201 writes the new pairs over the old pairs. If the digital content does not require copyright protection, on the other hand, the recording unit 201 can record the digital content in an unencrypted form.

The nullification judging unit 202 operates as follows. When digital content is received and recorded despite its copy-prohibition status, the nullification judging unit 202 judges, for each pair of encrypted data block and encrypted decryption key recorded on the recording medium, whether the pair should be nullified, based on a specific condition. In the present example, the nullification judging unit 202 judges, for each pair of encrypted data block corresponding to the broadcast time period of 10 minutes and encrypted unique key which are recorded on the HDD 905, whether the pair should be nullified.

The specific condition used here is whether the data block has been reproduced by the reproducing unit 110 or whether a predetermined time period has passed since the data block was received by the receiving unit 102 or recorded by the recording unit 201. In this embodiment, sequence information showing a sequence in which pairs of encrypted data blocks and encrypted decryption keys were recorded is stored on the recording medium. This being so, the nullification judging unit 202 makes the judgement such that the pairs are nullified in the recording sequence, and the recording unit 201 writes the new pairs to the recording areas storing the old pairs which are judged as needing to be nullified. In the present example, nine pairs of encrypted data blocks corresponding to the broadcast time period of 10 minutes and encrypted unique keys which are recorded in the nine recording areas on the HDD 905 are each nullified 90 minutes after it was written, as a result of overwriting with a new pair.

The sequential nullifying unit 203 operates as follows. Whenever the nullification judging unit 202 judges that a predetermined number of encrypted data blocks and their corresponding encrypted decryption keys should be nullified or that one or more encrypted data blocks whose total amount of data reaches a predetermined amount and their corresponding encrypted decryption keys should be nullified, the sequential nullifying unit 203 nullifies the judged pairs of encrypted data blocks and encrypted decryption keys. Here, if there are new pairs of encrypted data blocks and encrypted decryption keys which need to be recorded, the old pairs can be nullified by overwriting with the new pairs. If there is no new pair, the sequential nullifying unit 203 destroys each old pair by, for example, overwriting with arbitrary data.

Here, if the digital content has a fixed bit rate, i.e., the amount of data per unit time is constant, an old pair can completely be nullified by the overwriting with a new pair. However, if the digital content has a variable bit rate as in MPEG, the old pair may not be able to be completely nullified by the overwriting with the new pair.

In such a case, the sequential nullifying unit 203 may destroy the old pair by writing meaningless data over the remaining parts of the old pair which have not been overwritten with the new pair. As an alternative, the sequential nullifying unit 203 may destroy the remaining parts of the old pair when the processing capacity judging unit 112 judges that there is an enough processing capacity, and leave the remaining parts as they are when the processing capacity judging unit 112 judges that there is not an enough processing capacity.

The total nullifying unit 204 destroys all remaining parts of the pairs of encrypted data blocks and encrypted decryption keys which have not been destroyed by the sequential nullifying unit 203, when there is an enough processing capacity. Also, the total nullifying unit 204 destroys all remaining parts when the user indicates to stop time shifting.

(Operation)

Figure 6:
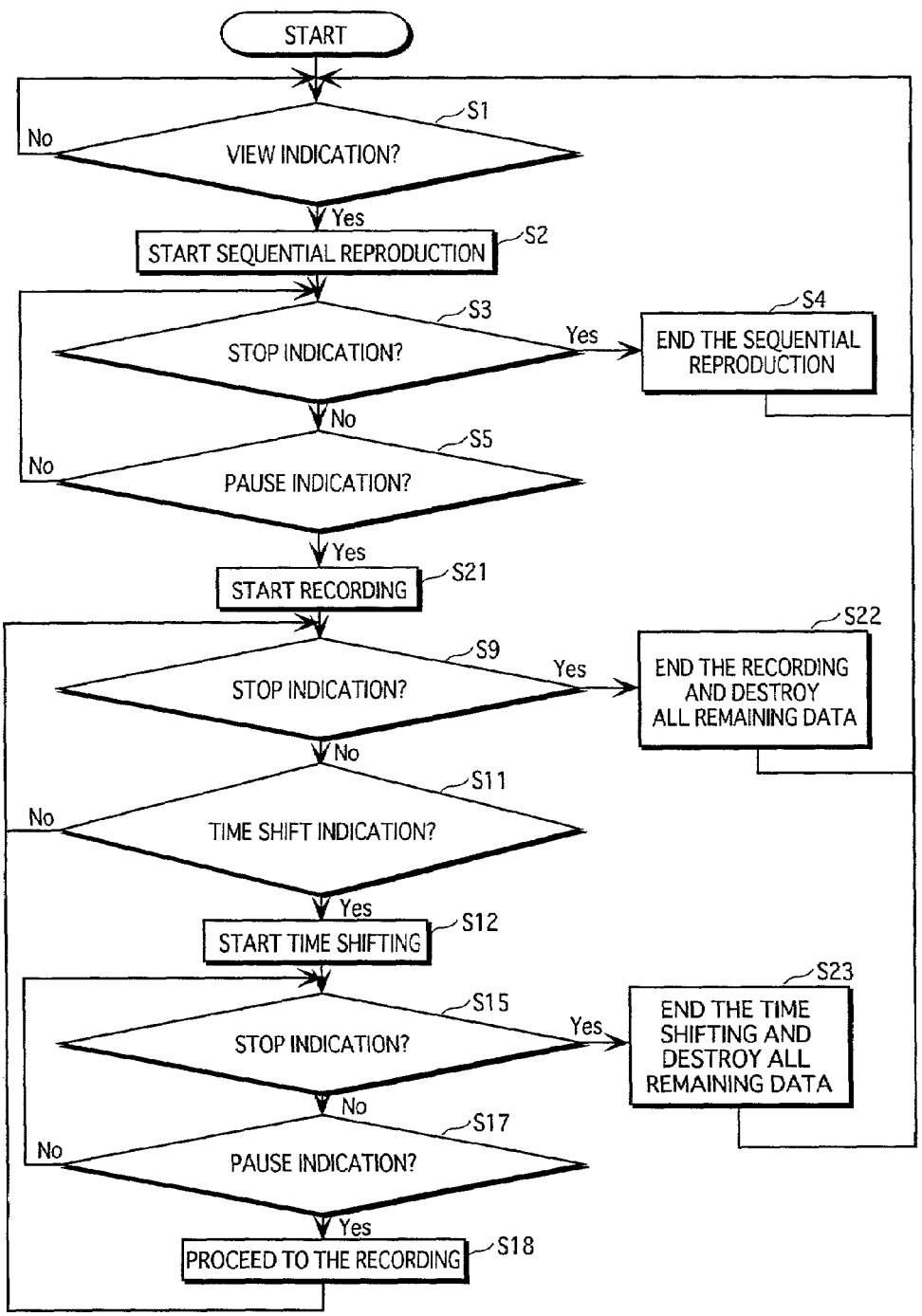
FIG. 6 shows an example operation of the reception/reproduction/nullification device of the second embodiment.

FIG. 6 shows an example operation of the reception/reproduction/nullification device 200 of the second embodiment.

Sequential reproduction, recording, time shifting, and nullification of the present invention are explained by referring to FIG. 6. Note here that steps which are the same as those in the first embodiment are given the same step numbers and their explanation has been omitted.

(1)-(5) Same as (1)-(5) of the first operation example in the first embodiment (S1-S5).

(6) Upon receiving the pause indication (S5:Yes), the recording starts (S21).

The key generating unit 104 randomly generates an encryption key and a decryption key corresponding to the encryption key using a random number of the like, for each data block corresponding to the predetermined broadcast time period which is descrambled by the descrambling unit 103. In the present example, a unique key is randomly generated for each data block corresponding to the broadcast time period of 10 minutes.

The data encrypting unit 105 encrypts the descrambled data block using the encryption key generated by the key generating unit 104, so that the encrypted data block can be decrypted by the corresponding decryption key. In the present example, the data block corresponding to the broadcast time period of 10 minutes is encrypted using the corresponding unique key.

The key encrypting unit 106 encrypts the decryption key corresponding to the encryption key used by the data encrypting unit 105, using the device ID. In the present example, the unique key is encrypted using the device ID.

The recording unit 201 reserves a plurality of recording areas which can each store data of the predetermined broadcast time period, on the recording medium. The recording unit 201 then sequentially records pairs of encrypted data blocks and encrypted decryption keys to the recording areas. In the present example, nine recording areas each capable of storing data corresponding to the broadcast time period of 10 minutes are reserved on the HDD 905, and pairs of encrypted data blocks corresponding to the broadcast time period of 10 minutes and encrypted unique keys are sequentially recorded to the nine recording areas. Here, if the recording areas already store pairs of encrypted data blocks and encrypted unique keys, the new pairs are written over the old pairs.

If any old pair was not completely destroyed by overwriting with a new pair, the sequential nullifying unit 203 destroys the remaining parts of the old pair by, for example, overwriting with meaningless data.

The reproducing unit 110 stops the sequential reproduction of the digital content.

(7) Same as (9) of the first operation example in the first embodiment (S9).

(8) Upon receiving the stop indication (S9:Yes), the operations of the receiving unit 102, descrambling unit 103, key generating unit 104, data encrypting unit 105, key encrypting unit 106, and recording unit 201 are stopped to end the recording. Also, the total nullifying unit 204 destroys all remaining data which has not been destroyed by the sequential nullifying unit 203, before returning to the stopped state (S22).

(9)-(10) Same as (11)-(12) of the first operation example in the first embodiment (S11-S12).

(11) Same as (15) of the first operation example in the first embodiment (S15).

(12) Upon receiving the stop indication (S15:Yes), the operations of the receiving unit 102, descrambling unit 103, key generating unit 104, data encrypting unit 105, key encrypting unit 106, recording unit 201, key decrypting unit 108, data decrypting unit 109, and reproducing unit 110 are stopped to end the time shifting. Also, the total nullifying unit 204 destroys all remaining data which has not been destroyed by the sequential nullifying unit 203, before returning to the stopped state (S23).

(13)-(14) Same as (17)-(18) of the first operation example in the first embodiment (S17-S18).

According to the second embodiment of the invention, copy-prohibited digital content can be recorded to enable time shifting, but the recorded digital content is nullified by overwriting with new data once a predetermined time period has passed. This enables user-friendliness to be improved without departing from the principle of copy prohibition. Furthermore, the sequential nullification is executed without increasing the load on the device.

Third Embodiment (Overview)

The third embodiment of the present invention is the following device. When digital content whose copying is permitted only once ("Copy one Generation") is received and recorded on a recording medium, the digital content can be moved to another recording medium, but the digital content on the original recording medium is nullified little by little upon being copied, so that the digital content will not remain on the original recording medium.

(Construction)

A reception/reproduction/nullification device of the third embodiment has the same hardware construction as that of the first embodiment, except for the following new functions of the microcomputer 804.

When the user receives digital content only one generation copy of which is permitted and records it to the HDD 905 in an encrypted form, the microcomputer 804 sequentially copies data blocks of the digital content which correspond to the predetermined broadcast time period and at the same time nullifies the copied data blocks on the HDD 905 so that they cannot be reproduced.

Figure 7:
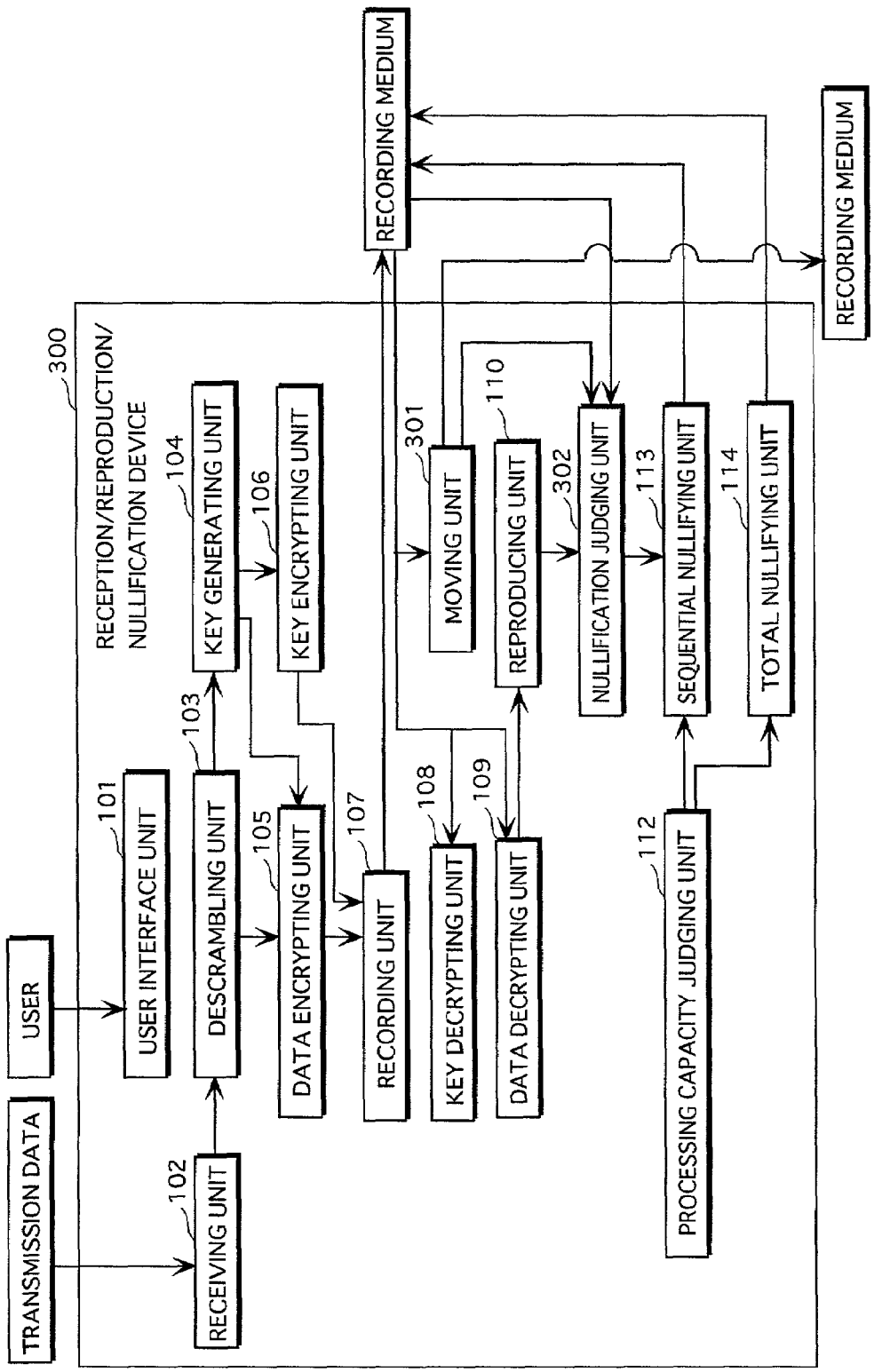
FIG. 7 is a functional block diagram of a reception/reproduction/nullification device of the third embodiment of the invention.

FIG. 7 is a functional block diagram of the reception/reproduction/nullification device of the third embodiment.

This reception/reproduction/nullification device 300 includes the user interface unit 101, the receiving unit 102, the descrambling unit 103, the key generating unit 104, the data encrypting unit 105, the key encrypting unit 106, the recording unit 107, the key decrypting unit 108, the data decrypting unit 109, the reproducing unit 110, a moving unit 301, a nullification judging unit 302, the processing capacity judging unit 112, the sequential nullifying unit 113, and the total nullifying unit 114. In actuality, the function of the receiving unit 102 corresponds to the function of the reception device 902 shown in FIG. 1. The function of the descrambling unit 103 corresponds to the function of the transport stream decoder 801 in FIG. 1. The functions of the key generating unit 104, data encrypting unit 105, key encrypting unit 106, recording unit 107, key decrypting unit 108, and data decrypting unit 109 correspond to the function of the encrypting engine 803 in FIG. 1. The function of the reproducing unit 110 corresponds to the function of the AV decoder 802 in FIG. 1. The functions of the moving unit 301, nullification judging unit 302, processing capacity judging unit 112, sequential nullifying unit 113, and total nullifying unit 114 correspond to the function of the microcomputer 804 in FIG. 1.

Construction elements which are the same as those in the first embodiment are given the same reference numerals and their explanation has been omitted.

The moving unit 301 moves pairs of encrypted data blocks and encrypted decryption keys which have been recorded on the recording medium, sequentially to another recording medium. The movement referred to here is an operation of (1) copying data from one recording medium to another recording medium and (2) rewriting data management information of the data on the original recording medium to show that the data has been deleted, without deleting the data itself on the original recording medium. In the present example, pairs of encrypted data blocks corresponding to the broadcast time period of 10 minutes and encrypted unique keys which are recorded on the HDD 905 are moved one by one to another recording medium.

The nullification judging unit 302 operates as follows. When digital content is recorded to one recording medium and then further recorded to another recording medium despite that only one generation copy of the digital content is permitted, the nullification judging unit 302 judges whether the digital content should be nullified, based on a specific condition. In the present example, the nullification judging unit 302 judges, for each pair of encrypted data block corresponding to the broadcast time period of 10 minutes and encrypted unique key, whether the pair should be nullified.

The specific condition here is whether the pair has been moved by the moving unit 301.

(Operation)

Figure 8:
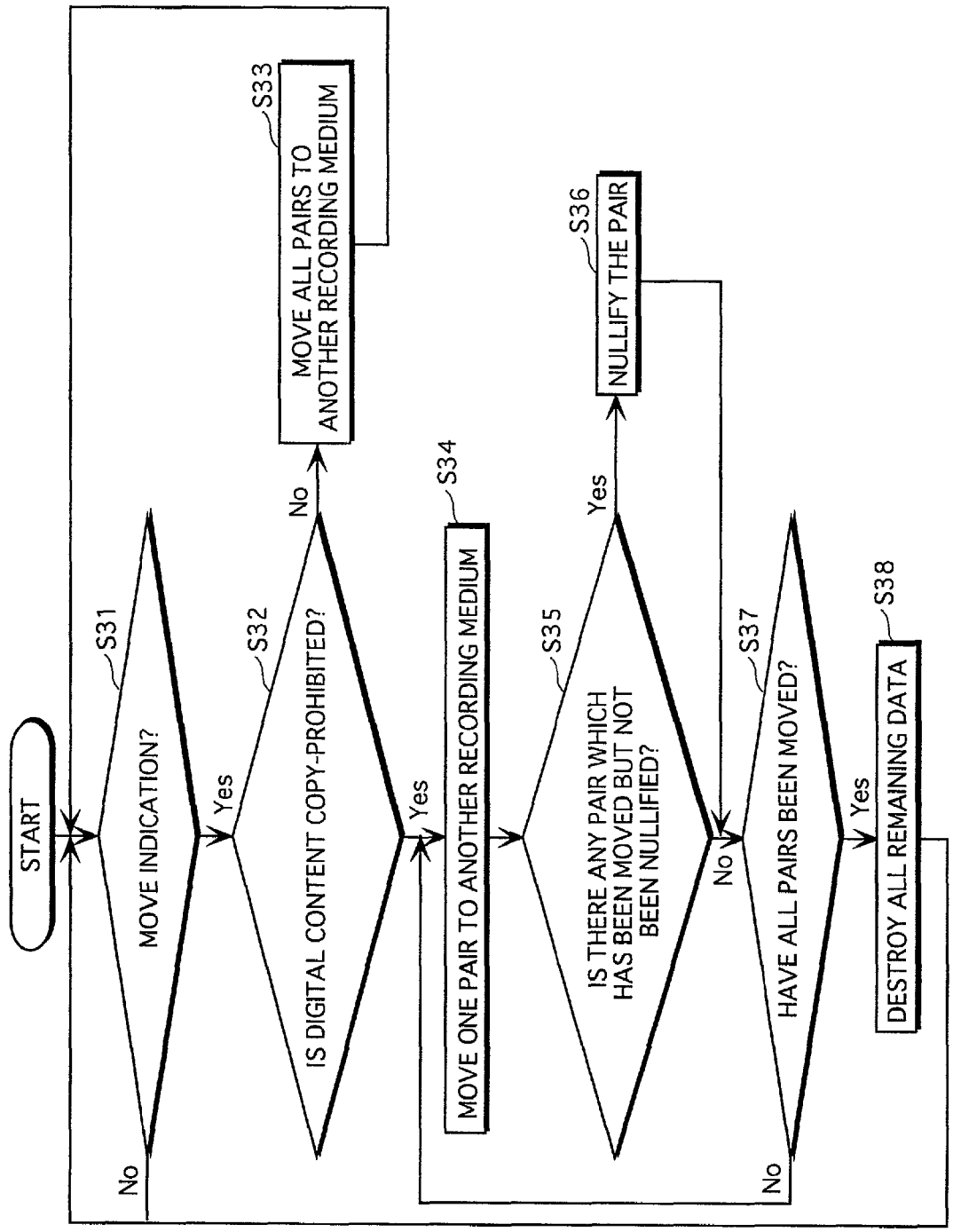
FIG. 8 shows an example operation of the reception/reproduction/nullification device of the third embodiment.

FIG. 8 shows an example operation of the reception/reproduction/nullification device 300 of the third embodiment.

Movement and nullification of the present invention are explained by referring to FIG. 8.

Suppose scrambled digital content whose copy control information is "Copy one Generation" is received, and a plurality of pairs of encrypted data blocks corresponding to the predetermined broadcast time period and encrypted unique keys are recorded on the HDD 905 with copy control information "Copy No more".

(1) In the stopped state, the user interface unit 101 waits for the user's indication to move digital content (S31).

(2) Upon receiving the move indication (S31:Yes), the nullification judging unit 302 judges whether the digital content is copy-prohibited, by referring to its copy control information (S32).

(3) If the digital content is not copy-prohibited (S32:No), the moving unit 301 moves all pairs of encrypted data blocks and encrypted decryption keys of the digital content to another recording medium (S33).

(4) If the digital content is copy-prohibited (e.g. if the copy control information is "Copy No more") (S32:Yes), the moving unit 301 moves one pair of encrypted data block and encrypted decryption key to another recording medium. In the present example, one pair of encrypted data block corresponding to the broadcast time period of 10 minutes and encrypted unique key which are recorded on the HDD 905 is moved to another recording medium.

(5) The nullification judging unit 302 judges whether there is any pair which has been moved but not been nullified (S35).

(6) If there is any pair which has been moved but not been nullified (S35:Yes), the sequential nullifying unit 113 nullifies the pair (S36).

(7) It is judged whether all pairs of encrypted data blocks and encrypted decryption keys have been moved (S37).

(8) If all pairs have been moved (S37:Yes), the total nullifying unit 114 destroys all remaining data which has not been destroyed by the sequential nullifying unit 113 (S38).

According to the third embodiment of the invention, copy-prohibited digital content can be moved to another recording medium but the digital content recorded on the original recording medium is then promptly nullified. This enables user-friendliness to improve without departing from the principle of copy prohibition.

The first to third embodiments describe the case where a different encryption key is generated for each data block corresponding to the predetermined broadcast time period. However, a plurality of data blocks may be encrypted using the same encryption key. Also, the predetermined broadcast time period is not limited to the above example but may be in any length. Furthermore, digital content which is recorded on the same recording medium may be encrypted using a single encryption key unique to the recording medium.

The first to third embodiments describe the case where only decryption keys are sequentially destroyed when there is not an enough processing capacity. However, when the same key is used for encrypting a plurality of data blocks as mentioned above, if a decryption key of one data block is destroyed, the other data blocks that use the same decryption key cannot be decrypted. In this case, the decryption key is not destroyed and instead the data blocks that use the decryption key are partly or completely destroyed. The decryption key can be destroyed after the data blocks that use the same decryption key are nullified.

Also, since data is usually recorded and managed in the form of files, each pair of encrypted data block and encrypted decryption key may be recorded as a file or a plurality of pairs may be recorded as a file. When each pair is recorded as an individual file, nullification can be performed in units of files. However, when a plurality of pairs are recorded as a single file, nullification needs to be performed for part of the file. In such a case, access to the nullified part should be restricted so as to keep the nullified part from being accessed by mistake. Access to part of a file can be restricted by, for example, using a seek restriction function of a file pointer mounted on a typical operating system.

In the second embodiment, the plurality of recording areas reserved by the recording unit 201 need not be consecutive. As one example, AV data of 4 Mbps is 300 MB per ten minutes. It is not efficient to reserve consecutive recording areas that can store such an amount of data on the HDD. In this case, each recording area is made up of a plurality of small consecutive areas. The relationship between each recording area and its small consecutive areas is independently managed by a file system, which provides each recording area to higher applications as a consecutive recording area to realize access using a file pointer.

Programs that can execute the operations of the first to third embodiments on computer may be recorded on computer-readable recording media and distributed for transaction. Such programs may also be distributed via network.

Examples of the computer-readable recording media include a removable recording medium such as a floppy disk, a CD, an MO, a DVD, or a memory card, and a fixed recording medium such as a hard disk and a semiconductor memory.

Although the present invention has been fully described by way of examples with reference to the accompanying drawings, it is to be noted that various changes and modifications will be apparent to those skilled in the art.

Therefore, unless such changes and modifications depart from the scope of the present invention, they should be construed as being included therein.

What is claimed is:

1. A computing device comprising:

a recording medium operable to record target data, the target data being made up of a plurality of data blocks;

a reproducing unit operable to reproduce the target data from the recording medium;

a first judging unit operable to judge, for each data block recorded on the recording medium, whether the data block needs to be nullified when the data block is reproduced from the recording medium;

a sequential nullifying unit operable to destroy only a part of the reproduced data block judged as needing to be nullified while the reproducing unit reproduces the target data from the recording medium, the part of the reproduced data block including data necessary to reproduce remaining parts of the reproduced data block judged as needing to be nullified, the remaining parts being unable to be reproduced without the part of the reproduced data block judged as needing to be nullified;

a total nullifying unit operable to destroy all of the remaining parts that have not been destroyed by the sequential nullifying unit; and a processing capacity judging unit operable to judge whether the computing device has a processing capacity sufficient to destroy all of the remaining parts while the reproducing unit reproduces the target data from the recording medium, and to control the total nullifying unit to destroy all of the remaining parts when the processing capacity judging unit judges that the computing device has the processing capacity sufficient to destroy all of the remaining parts.

2. The computing device of claim 1,
wherein the recording medium stores sequence information that shows a sequence in which the plurality of data blocks were recorded onto the recording medium, and
wherein said first judging unit judges, in succession, the plurality of data blocks in the sequence shown by the sequence information, as needing to be nullified.

3. The computing device of claim 2,
wherein the reproducing unit reproduces the target data recorded on the recording medium, in units of data blocks, and
wherein said first judging unit further judges that each data block which was reproduced by the reproducing unit needs to be nullified.

4. The computing device of claim 3,
wherein the target data is content data which is transmitted from an external device and recorded on the recording medium,
wherein the content data is accompanied with copy control information showing whether copying of the content data is permitted or prohibited,
wherein the reproducing unit reproduces the content data recorded on the recording medium, in units of data blocks, and
wherein, only if the copy control information accompanying the content data shows that the copying of the content data is prohibited, said first judging unit judges that each data block which was reproduced by the reproducing unit needs to be nullified.

5. The computing device of claim 1,
wherein each data block has a length corresponding to a fixed transmission time period, and
wherein a specified number of recording areas which are each used as a recording area of a data block are reserved on the recording medium.

6. The computing device of claim 1,
wherein the recording medium stores time limit information showing a recording time limit of each data block recorded on the recording medium, the recording time limit being a time limit after which retention of the data block on the recording medium is prohibited,
wherein said first judging unit judges that each data block whose recording time limit is reached needs to be nullified, based on the time limit information.

7. The computing device of claim 6,
wherein the reproducing unit reproduces the target data recorded on the recording medium, in units of data blocks, and
wherein said first judging unit further judges that each data block which was utilized by the reproducing unit needs to be nullified.

8. The computing device of claim 7,
wherein the target data is content data which is transmitted from an external device and recorded on the recording medium,
wherein the content data is accompanied with copy control information showing whether copying of the content data is permitted or prohibited,
wherein the reproducing unit reproduces the content data recorded on the recording medium, in units of data blocks, and
wherein, only if the copy control information accompanying the content data shows that the copying of the content data is prohibited, said first judging unit judges that each data block which was reproduced by the reproducing unit needs to be nullified.

9. The computing device of claim 1,
wherein the reproducing unit reproduces the target data recorded on the recording medium, in units of data blocks, and
wherein said first judging unit judges that each data block which was reproduced by the reproducing unit needs to be nullified.

10. The computing device of claim 9,
wherein the target data is content data which is transmitted from an external device and recorded on the recording medium,
wherein the content data is accompanied with copy control information showing whether copying of the content data is permitted or prohibited,
wherein the reproducing unit reproduces the content data recorded on the recording medium, in units of data blocks, and
wherein, only if the copy control information accompanying the content data shows that the copying of the content data is prohibited, said first judging unit judges that each data block on the recording medium which was reproduced by the reproducing unit needs to be nullified.

11. The computing device of claim 9, further comprising a recording unit that records the target data recorded on the recording medium, to another recording medium, in units of data blocks,
wherein the target data is accompanied with copy control information showing whether copying of the target data is permitted or prohibited,
wherein the reproducing unit reproduces the target data recorded on the another recording medium, in units of data blocks, and
wherein, only if the copy control information accompanying the target data shows that the copying of the target data is prohibited, said first judging unit judges that each data block on the another recording medium which was recorded by the reproducing unit needs to be nullified.

12. The computing device of claim 1,
wherein the target data is MPEG data including I pictures, and wherein the part of the data block necessary to reproduce the remaining parts of the data block is an I picture.

13. The computing device of claim 1,
wherein the target data is MPEG data including I pictures, and
wherein the part of the data block necessary to reproduce the remaining parts of the data block is a first sector of an I picture.

14. The computing device of claim 1,
wherein each data block recorded on the recording medium has been encrypted using an individual encryption key,
wherein a decryption key for decrypting the encrypted data block is stored on the recording medium, and
wherein said sequential nullifying unit destroys at least a decryption key corresponding to a data block which is judged as needing to be nullified.

15. The computing device of claim 14, further comprising:
an acquiring unit operable to acquire the target data in an encoded form;
a decoding unit operable to decode the encoded target data using a user key which has been provided to authorized users in advance, to obtain the target data;
a key generating unit operable to generate an arbitrary encryption key and a decryption key corresponding to the encryption key, for each data block of the target data;
a data encrypting unit operable to encrypt the data block using the encryption key so that the encrypted data block can be decrypted using the corresponding decryption key;
a key encrypting unit operable to encrypt the decryption key using an identifier unique to the data nullification device; and
a recording unit operable to record the encrypted data block and the encrypted decryption key onto the recording medium.

16. The computing device of claim 15,
wherein at least said decoding unit, said key generating unit, said data encrypting unit, and said key encrypting unit are contained in a single semiconductor chip.

17. A computer readable medium storing a computer program, the computer program being utilized by a computer for nullifying at least a part of target data recorded on a recording medium, the computer readable medium comprising:
a recording code segment for recording target data on the recording medium, the target data being made up of a plurality of data blocks;
a reproducing code segment for reproducing the target data from the recording medium;
a first judging code segment for judging, for each data block of the target data, whether the data block needs to be nullified when the data block is reproduced from the recording medium;
a sequential destroying code segment for destroying only a part of the reproduced data block judged as needing to be nullified while the target data is reproduced from the recording medium, the part of the reproduced data block including data necessary to reproduce remaining parts of the reproduced data block judged as needing to be nullified, the remaining parts being unable to be reproduced without the part of the reproduced data block judged as needing to be nullified;
a second judging code segment for judging whether a sufficient processing capacity at the computer exists to destroy all of the remaining parts that have not been destroyed by the sequential destroying code segment; and
a total destroying code segment for destroying all of the remaining parts while the target data is reproduced from the recording medium, when it is judged that there is the sufficient processing capacity to destroy all of the remaining parts.

18. The computer readable medium of claim 17,
wherein the recording medium stores sequence information that shows a sequence in which the plurality of data blocks were recorded onto the recording medium, and
wherein the first judging code segment judges, in succession, the plurality of data blocks in the sequence shown by the sequence information, as needing to be nullified.

19. The computer readable medium of claim 18,
wherein the reproducing code segment reproduces the target data recorded on the recording medium, in units of data blocks, and
wherein the first judging code segment judges that each data block which was utilized in the reproducing code segment needs to be nullified.

20. The computer readable medium of claim 17,
wherein the recording medium stores time limit information showing a recording time limit of each data block recorded on the recording medium, the recording time limit being a time limit after which retention of the data block on the recording medium is prohibited, and
wherein the first judging code segment judges that each data block whose recording time limit is reached needs to be nullified, based on the time limit information.

21. The computer readable medium of claim 20,
wherein the reproducing code segment reproduces the target data recorded on the recording medium, in units of data blocks, and
wherein the first judging code segment judges that each data block which was reproduced by the reproducing code segment needs to be nullified.

22. The computer readable medium of claim 17,
wherein the reproducing code segment reproduces the target data recorded on the recording medium, in units of data blocks, and
wherein the first judging code segment judges that each data block which was reproduced by the reproducing code segment needs to be nullified.

23. A data nullification method for nullifying at least a part of target data recorded on a recording medium, the data nullification method comprising:
recording the target data on the recording medium, the target data being made up of a plurality of data blocks;
reproducing the target data from the recording medium;
judging, for each data block recorded on the recording medium, whether the data block needs to be nullified when the data block is reproduced from the recording medium;
destroying only a part of the reproduced data block judged as needing to be nullified while the target data is reproduced from the recording medium, the part of the reproduced data block including data necessary to reproduce remaining parts of the reproduced data block judged as needing to be nullified, the remaining parts being unable to be reproduced without the part of the reproduced data block judged as needing to be nullified;
judging whether a sufficient processing capacity exists to destroy all of the remaining parts that have not been destroyed while the target data is reproduced from the recording medium; and
destroying all of the remaining parts when it is judged that there is the sufficient processing capacity to destroy all of the remaining parts.

24. The data nullification method of claim 23,
wherein the recording medium stores sequence information that shows a sequence in which the plurality of data blocks were recorded onto the recording medium, and
wherein the judging, for each data block recorded on the recording medium, whether the data block needs to be nullified comprises judging, in succession, the plurality of data blocks in the sequence shown by the sequence information, as needing to be nullified.

25. The data nullification method of claim 24,
wherein the reproducing comprises reproducing the target data recorded on the recording medium, in units of data blocks, and
wherein the judging, for each data block recorded on the recording medium, whether the data block needs to be nullified comprises judging that each data block which was reproduced needs to be nullified.

26. The data nullification method of claim 23,
wherein the recording medium stores time limit information showing a recording time limit of each data block recorded on the recording medium, the recording time limit being a time limit after which retention of the data block on the recording medium is prohibited, and
wherein the judging, for each data block recorded on the recording medium, whether the data block needs to be nullified comprises judging that each data block whose recording time limit is reached needs to be nullified, based on the time limit information.

27. The data nullification method of claim 26,
wherein the reproducing comprises reproducing the target data recorded on the recording medium, in units of data blocks, and
wherein the judging, for each data block recorded on the recording medium, whether the data block needs to be nullified comprises judging that each data block which was reproduced needs to be nullified.

28. The data nullification method of claim 23,
wherein the reproducing comprises reproducing the target data recorded on the recording medium, in units of data blocks, and
wherein the judging, for each data block recorded on the recording medium, whether the data block needs to be nullified comprises judging that each data block which was reproduced needs to be nullified.

29. The data nullification method of claim 23,
wherein each data block recorded on the recording medium has been encrypted using an individual encryption key,
wherein a decryption key for decrypting the encrypted data block is stored on the recording medium, and
wherein the destroying only a part of the data block judged as needing to be nullified comprises destroying at least a decryption key corresponding to a data block which is judged as needing to be nullified.

* * * * *